US011177061B2

(12) United States Patent
Yamaguchi

(10) Patent No.: US 11,177,061 B2
(45) Date of Patent: Nov. 16, 2021

(54) PROPORTIONAL SOLENOID, METHOD FOR MANUFACTURING THE SAME, AND METHOD FOR CONTROLLING CHARACTERISTICS OF PROPORTIONAL SOLENOID

(71) Applicant: HITACHI METALS, LTD., Tokyo (JP)

(72) Inventor: Satoshi Yamaguchi, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 188 days.

(21) Appl. No.: 16/615,700

(22) PCT Filed: May 17, 2018

(86) PCT No.: PCT/JP2018/019193
§ 371 (c)(1),
(2) Date: Nov. 21, 2019

(87) PCT Pub. No.: WO2018/216603
PCT Pub. Date: Nov. 29, 2018

(65) Prior Publication Data
US 2020/0227188 A1    Jul. 16, 2020

(30) Foreign Application Priority Data
May 22, 2017   (JP) .............................. JP2017-100631

(51) Int. Cl.
*H01F 3/00*   (2006.01)
*H01F 7/08*   (2006.01)
(Continued)

(52) U.S. Cl.
CPC ............... *H01F 7/081* (2013.01); *H01F 7/16* (2013.01); *H01F 27/24* (2013.01); *H01F 41/02* (2013.01); *F16K 31/0675* (2013.01)

(58) Field of Classification Search
CPC . H01F 7/081; H01F 7/16; H01F 27/24; H01F 41/02; H01F 3/10; H01F 2007/1692; H01F 2003/106; F16K 31/0675
(Continued)

(56) References Cited

U.S. PATENT DOCUMENTS 3,050,449 A * 8/1962 Moore ................. G01N 1/10
202/152
3,365,861 A * 1/1968 Crowley ........... B01D 53/0454
96/115
(Continued)

FOREIGN PATENT DOCUMENTS

JP    63-40304 A    2/1988
JP    4-263407 A    9/1992
(Continued)

OTHER PUBLICATIONS

Office Action dated Mar. 3, 2021, issued in counterpart CN Application No. 201880033599.5, with English Translation. (12 pages).
(Continued)

*Primary Examiner* — Shawki S Ismail
*Assistant Examiner* — Lisa N Homza
(74) *Attorney, Agent, or Firm* — Westerman, Hattori, Daniels & Adrian, LLP

(57) ABSTRACT

A proportional solenoid (100) of the present invention includes a tubular member (101) in which a first magnetic region (12a) mainly including a ferrite structure, a first semimagnetic region (14a) present at a position spaced apart from an adsorptive surface (11b), the first semimagnetic region including a ferrite structure, a martensite structure, and an austenite structure, and a nonmagnetic region (13) present at a position spaced farther apart from the adsorptive
(Continued)

surface than the semimagnetic region, the nonmagnetic region mainly including an austenite structure, are formed continuously and integrally.

6 Claims, 12 Drawing Sheets

(51) Int. Cl.
    *H01F 7/16* (2006.01)
    *H01F 27/24* (2006.01)
    *H01F 41/02* (2006.01)
    *F16K 31/06* (2006.01)
(58) Field of Classification Search
    USPC ........................................................ 335/281
    See application file for complete search history.

(56) References Cited

U.S. PATENT DOCUMENTS

| | | | | |
|---|---|---|---|---|
| 3,507,097 | A * | 4/1970 | Crowley | B01D 53/261 96/114 |
| 3,982,224 | A * | 9/1976 | Patton | G01V 11/002 367/84 |
| 4,628,928 | A * | 12/1986 | Lowell | A61M 25/00 606/1 |
| 4,771,772 | A * | 9/1988 | DeWitt | A61N 1/37512 604/892.1 |
| 5,429,099 | A * | 7/1995 | DeLand | F02M 25/0836 123/516 |
| 5,865,907 | A | 2/1999 | Katayama et al. | |
| 6,016,691 | A * | 1/2000 | Cook | F02M 25/0818 123/520 |
| 2008/0078717 | A1 * | 4/2008 | Shigesada | B29C 45/14598 210/455 |
| 2010/0126007 | A1 | 5/2010 | Seitter et al. | |
| 2010/0283340 | A1 * | 11/2010 | Fradella | H02K 7/025 310/74 |
| 2011/0297753 | A1 * | 12/2011 | McAlister | F02M 55/008 239/5 |
| 2014/0130756 | A1 * | 5/2014 | McAlister | F02D 19/081 123/1 A |
| 2015/0252757 | A1 * | 9/2015 | McAlister | F02B 43/10 123/297 |
| 2017/0182858 | A1 * | 6/2017 | Coakley | B60C 17/04 |
| 2020/0164304 | A1 * | 5/2020 | Basham | B01D 53/26 |

FOREIGN PATENT DOCUMENTS

| | | |
|---|---|---|
| JP | 7-11397 A | 1/1995 |
| JP | 10-212588 A | 8/1998 |
| JP | 2001-6925 A | 1/2001 |
| JP | 2010-510458 A | 4/2010 |
| JP | 2013-28825 A | 2/2013 |

OTHER PUBLICATIONS

International Search Report dated Jul. 31, 2018, issued in counterpart International Application No. PCT/JP2018/019193 (2 pages).

* cited by examiner

PROPORTIONAL SOLENOID, METHOD FOR MANUFACTURING THE SAME, AND METHOD FOR CONTROLLING CHARACTERISTICS OF PROPORTIONAL SOLENOID

TECHNICAL FIELD

The present invention relates to a proportional solenoid, a method for manufacturing the same, and a method for controlling the characteristics of a proportional solenoid.

BACKGROUND ART

In general, a proportional solenoid that controls the position of a movable magnetic body in an axial direction in proportion to the magnitude of electrical current flowing through a coil is known as a type of solenoid that converts electric power into linear motion of the movable magnetic body. Such a proportional solenoid is disclosed in Japanese Patent Laid-Open No. 2001-6925 and Japanese Patent Laid-Open No. 4-263407, for example.

Japanese Patent Laid-Open No. 2001-6925 and Japanese Patent Laid-Open No. 4-263407 each discloses a solenoid including a pipe (cylindrical yoke) mounted in a coil and a movable iron core that slides on the inner peripheral surface of the pipe. In this pipe of the solenoid, a tapered surface provided at an end of a magnetic portion made of a ferromagnetic material and a tapered surface provided at an end of a nonmagnetic portion made of a nonmagnetic material are joined to each other in a state in which the same are in surface contact with each other. Thus, in a region in which a tapered surface is formed, a magnetic gradient is generated such that the magnetization increases from the nonmagnetic portion toward the magnetic portion, and thus in the solenoid, an attractive force curve having a horizontal characteristic portion (flat region) in which an attractive force is substantially constant regardless of the position of the movable iron core is generated. Consequently, an attractive force proportional to the magnitude of the electrical current is generated in the horizontal characteristic portion, and thus the attractive force (electrical current amount) is controlled so as to balance the elastic force of a spring provided outside the solenoid such that the movable magnetic body can be located at a predetermined position.

In the proportional solenoid disclosed in Japanese Patent Laid-Open No. 2001-6925, the nonmagnetic material is build-up welded to the tapered surface of the magnetic portion made of the ferromagnetic material, and then is cut until the magnetic portion is exposed such that the tapered surface of the magnetic portion and the tapered surface of the nonmagnetic portion are mechanically joined to each other. In the solenoid disclosed in Japanese Patent Laid-Open No. 4-263407, the nonmagnetic material is braze-joined to the magnetic portion made of a ferromagnet, and then is cut until the magnetic portion is exposed such that the tapered surface of the magnetic portion and the tapered surface of the nonmagnetic portion are mechanically joined to each other. In the proportional solenoid, the taper angle θ (see FIG. 7) of the tapered surface described above is one of the most important factors for determining the attractive force curve, but in a method for manufacturing the solenoid described in each of Japanese Patent Laid-Open No. 2001-6925 and Japanese Patent Laid-Open No. 4-263407, this tapered surface is formed by machining, and thus it is easy to control the taper angle θ.

On the other hand, a solenoid including a cylindrical yoke manufactured using a composite magnetic member including a ferromagnetic portion and a nonmagnetic portion is known although it is not a proportional solenoid that controls the position of a movable magnetic body in an axial direction in proportion to the magnitude of electrical current flowing through a coil. Such a solenoid is disclosed in Japanese Patent Laid-Open No. 7-11397.

Japanese Patent Laid-Open No. 7-11397 discloses a solenoid valve (solenoid) including a sleeve (cylindrical yoke) made of a composite magnetic member including a ferromagnetic portion and a nonmagnetic portion and a plunger (movable iron core) that slides in the sleeve. This sleeve of the solenoid valve is produced by converting a cylindrical ferromagnetic material converted from being nonmagnetic (austenite) into being ferromagnetic (martensite) by cold working into being nonmagnetic by partial high-frequency heating.

PRIOR ART DOCUMENT

Patent Document

Patent Document 1: Japanese Patent Laid-Open No. 2001-6925
Patent Document 2: Japanese Patent Laid-Open No. 4-263407
Patent Document 3: Japanese Patent Laid-Open No. 7-11397

SUMMARY OF THE INVENTION

Problems to be Solved by the Invention

However, in the proportional solenoid disclosed in Japanese Patent Laid-Open No. 2001-6925, the tapered surface of the magnetic portion and the tapered surface of the nonmagnetic portion are joined to each other by buildup welding such that the mechanical strength at the joint portion is reduced, and when the proportional solenoid is used under high pressure, there is a problem that the joint portion breaks. Similarly, in the solenoid disclosed in Japanese Patent Laid-Open No. 4-263407, the magnetic material and the nonmagnetic material are joined to each other by a brazing material such that the mechanical strength at the joint portion is reduced, and when the solenoid is used under high pressure, there is a problem that the joint portion breaks.

The solenoid valve disclosed in Japanese Patent Laid-Open No. 7-11397 is a solenoid including only a ferromagnetic portion and a nonmagnetic portion, and thus unlike the solenoid disclosed in each of Japanese Patent Laid-Open No. 2001-6925 and Japanese Patent Laid-Open No. 4-263407, it seems that the solenoid valve is not assumed to be used as a proportional solenoid. In other words, in the solenoid valve disclosed in Japanese Patent Laid-Open No. 7-11397, it seems that an attractive force curve having a desired flat region cannot be obtained due to the fact that the solenoid valve includes only the ferromagnetic portion and the nonmagnetic portion. Furthermore, when the structure of the proportional solenoid in which the nonmagnetic portion and the ferromagnetic portion are mechanically joined to each other with tapered surfaces as in Japanese Patent Laid-Open No. 2001-6925 and Japanese Patent Laid-Open No. 4-263407 is realized in the structure disclosed in Japanese Patent Laid-Open No. 7-11397, it seems to be necessary to form the tapered surface between the ferromagnetic portion and the nonmagnetic portion by heat treatment, but it seems to be difficult to form the tapered surface strictly by heat treatment instead of machining.

The present invention has been proposed in order to solve the aforementioned problems, and an object of the present invention is to provide a proportional solenoid, the breakage of which can be significantly reduced or prevented even when the proportional solenoid is used under high pressure, and capable of obtaining an attractive force curve having a desired flat region, a method for manufacturing the proportional solenoid, and a method for controlling the characteristics of a proportional solenoid to obtain an attractive force curve having a desired flat region.

Means for Solving the Problems

As a result of earnest investigations, the inventor has found that the semimagnetic region is formed between the nonmagnetic region and the magnetic region such that solenoid characteristics (attractive force curve) equivalent to those of a proportional solenoid in which a nonmagnetic portion and a ferromagnetic portion are mechanically joined to each other with tapered surfaces are obtained without strictly forming a tapered surface. Then, the inventor has completed the present invention. That is, a proportional solenoid according to a first aspect of the present invention includes a fixed iron core including a tubular member made of a composite magnetic material and a movable magnetic body inserted into the tubular member, the movable magnetic body being movable in an axial direction of the tubular member, the tubular member includes an adsorptive surface provided substantially parallel to a surface orthogonal to the axial direction, the adsorptive surface facing the movable magnetic body, and a first magnetic region including the adsorptive surface, the first magnetic region mainly including a ferrite structure, a first semimagnetic region present at a position spaced apart from the adsorptive surface, the first semimagnetic region including a ferrite structure, a martensite structure, and an austenite structure, and a nonmagnetic region present at a position spaced farther apart from the adsorptive surface than the first semimagnetic region, the nonmagnetic region mainly including an austenite structure, are formed continuously and integrally along the axial direction of the tubular member.

In the proportional solenoid according to the first aspect of the present invention, as described above, the first magnetic region mainly including the ferromagnetic ferrite structure, the first semimagnetic region including the ferrite structure, the ferromagnetic martensite structure having slightly lower magnetization than the ferrite structure, and the nonmagnetic austenite structure, and the nonmagnetic region mainly including the austenite structure are formed continuously and integrally. Accordingly, the tubular member having such structures that the magnetization increases from the nonmagnetic region toward the first magnetic region (the magnetization decreases from the first magnetic region toward the nonmagnetic region) can be produced. Consequently, the proportional solenoid with solenoid characteristics (attractive force curve) similar to those of a proportional solenoid including a fixed iron core with a completely different structure from the conventional proportional solenoid by machining, which is a pipe in which tapered surfaces of a magnetic portion and a nonmagnetic portion formed by machining are butt-joined to each other, can be obtained. This structure is conceivably a structure that cannot be realized in Patent Document 3 described above, in which a cylindrical ferromagnetic material having a martensite structure is heat-treated and converted into an austenite structure. Furthermore, the tubular member of the proportional solenoid includes the first magnetic region, the first semimagnetic region, and the nonmagnetic region formed continuously and integrally along the axial direction of the tubular member, and thus the tubular member includes no joint portion having a low mechanical strength. Thus, even when the proportional solenoid is used under high pressure, breakage (physical separation) of the fixed iron core can be significantly reduced or prevented.

A method for manufacturing a proportional solenoid according a second aspect of the present invention includes forming a magnetic region mainly including a ferrite structure and a nonmagnetic region mainly including an austenite structure by heat-treating a tubular member made of a composite magnetic material mainly including a ferrite structure, and the method further includes preparing the tubular member made of the composite magnetic material mainly including the ferrite structure and containing 0.3 mass % or more and 1.2 mass % or less of C (carbon), arranging a high-frequency coil in such a manner as to circumferentially surround a heating position including a nonmagnetic region forming portion of the tubular member, rapidly heating the nonmagnetic region forming portion to a heating temperature of 1000° C. or higher and 1300° C. or lower by causing an electrical current to flow through the high-frequency coil, holding a heated state of the nonmagnetic region forming portion for a holding time of 5 seconds or more and 20 seconds or less, forming, continuously and integrally along an axial direction of the tubular member in the tubular member, the magnetic region, the nonmagnetic region formed in the nonmagnetic region forming portion, and a semimagnetic region formed between the magnetic region and the nonmagnetic region and having such a magnetic gradient that magnetization increases from the nonmagnetic region toward the magnetic region by rapidly cooling the tubular member that has been heated, and inserting a movable magnetic body movable in the axial direction into the tubular member including the magnetic region, the semimagnetic region, and the nonmagnetic region.

In the method for manufacturing a proportional solenoid according the second aspect of the present invention, as described above, the magnetic region, the semimagnetic region, and the nonmagnetic region are formed continuously and integrally in the same tubular member along the axial direction of the tubular member without having joint portions therebetween. Accordingly, the tubular member includes no joint portion having a low mechanical strength, and thus it is possible to provide the proportional solenoid, the breakage of which can be significantly reduced or prevented even when the proportional solenoid is used under high pressure. Furthermore, no compound resulting from buildup welding or the like is formed at a boundary between the magnetic region and the semimagnetic region, for example, and thus it is possible to significantly reduce or prevent changes in magnetic characteristics due to the compound.

Furthermore, the nonmagnetic region forming portion of the tubular member made of the composite magnetic material containing 0.3 mass % or more and 1.2 mass % or less of C (carbon) is heated to a heating temperature of 1000° C. or higher and 1300° C. or lower. Thus, in the nonmagnetic region forming portion, carbides contained in the composite magnetic material mainly including the ferromagnetic ferrite structure are dissolved in the structure such that the nonmagnetic austenite structure can be stably formed. Consequently, the nonmagnetic region including the austenite structure can be reliably formed in the nonmagnetic region forming portion.

Furthermore, the nonmagnetic region forming portion is rapidly heated to a heating temperature of 1000° C. or higher and 1300° C. or lower using the high-frequency coil. Thus, the nonmagnetic region forming portion can be intensively and rapidly heated by the high-frequency coil, and thus conduction of heat to a portion excluding the nonmagnetic region forming portion and the periphery thereof (a portion in which the magnetic region is formed) can be significantly reduced or prevented. Consequently, it is possible to reliably significantly reduce or prevent transformation of the ferrite structure in the portion in which the magnetic region is formed.

Furthermore, the nonmagnetic region forming portion is rapidly heated to a heating temperature of 1000° C. or higher and 1300° C. or lower, and the heated state of the nonmagnetic region forming portion is held for a holding time of 5 seconds or more and 20 seconds or less after the rapid heating. Due to the rapid heating and the holding of the heated state after the rapid heating, a portion of the heat generated when the nonmagnetic region forming portion is heated is conducted such that in addition to the nonmagnetic austenite structure, an unstable structure in which carbides remain can be formed around the nonmagnetic region forming portion (a portion in which the semimagnetic region is formed). Consequently, the heated tubular member is rapidly cooled such that the unstable structure can be transformed into a martensite structure. A relatively large amount of heat is conducted in the portion, in which the semimagnetic region is formed, in the vicinity of the nonmagnetic region forming portion, and thus the amount of formation of the unstable structure can be decreased. In addition, in the portion in which the semimagnetic region is formed, the amount of heat conduction decreases as a distance from the nonmagnetic region forming portion increases, and thus the amount of formation of the unstable structure can be increased. Consequently, the heated tubular member is rapidly cooled such that in the portion in which the semimagnetic region is formed, the abundance ratio of the austenite structure, which is nonmagnetic and has small magnetization, can decrease from the nonmagnetic region toward the magnetic region, and the abundance ratio of the martensite structure, which is ferromagnetic and has slightly smaller magnetization than the ferrite structure, can increase from the nonmagnetic region toward the magnetic region. Therefore, such a gradual magnetic gradient that the magnetization increases from the nonmagnetic region toward the magnetic region can be easily formed in the semimagnetic region.

Furthermore, the heated state of the nonmagnetic region forming portion is held for a holding time of 5 seconds or more such that the heat can be reliably conducted in the thickness direction (radial direction) of the tubular member, and thus the nonmagnetic region can be reliably formed over the entire thickness. The heated state of the nonmagnetic region forming portion is held for a holding time of 20 seconds or less such that heat conduction to the portion excluding the nonmagnetic region forming portion and the periphery thereof (the portion in which the magnetic region is formed) due to the long holding time can be significantly reduced or prevented.

A method for controlling characteristics of a proportional solenoid according to a third aspect of the present invention includes forming a magnetic region mainly including a ferrite structure and a nonmagnetic region mainly including an austenite structure by heat-treating a tubular member made of a composite magnetic material mainly including a ferrite structure, and the method further includes arranging a high-frequency coil in such a manner as to circumferentially surround a heating position including a nonmagnetic region forming portion of the tubular member made of the composite magnetic material mainly including the ferrite structure and containing 0.3 mass % or more and 1.2 mass % or less of C (carbon), rapidly heating the nonmagnetic region forming portion to a heating temperature of 1000° C. or higher and 1300° C. or lower by causing an electrical current to flow through the high-frequency coil, holding a heated state of the nonmagnetic region forming portion for a holding time of 5 seconds or more and 20 seconds or less, rapidly cooling the tubular member that has been heated, forming, continuously and integrally along an axial direction of the tubular member in the tubular member, the magnetic region, the nonmagnetic region formed in the nonmagnetic region forming portion, and a semimagnetic region formed between the magnetic region and the nonmagnetic region and having such a magnetic gradient that magnetization increases from the nonmagnetic region toward the magnetic region by rapidly cooling the tubular member that has been heated, and inserting a movable magnetic body movable in the axial direction into the tubular member including the magnetic region, the semimagnetic region, and the nonmagnetic region. The characteristics of the proportional solenoid is controlled by adjusting at least one of the heating position, a heating rate, the heating temperature, the holding time, and a holding temperature gradient to control a distribution of magnetic characteristics of the tubular member.

In the method for controlling characteristics of a proportional solenoid according to the third aspect of the present invention, in addition to the advantageous effects of the second aspect, at least one of the heating position, the heating rate, the heating temperature, the holding time, and the holding temperature gradient is adjusted as described above such that the distribution of the magnetic characteristics of the tubular member is controlled. Thus, at least one of the heating position, the heating rate, the heating temperature, the holding time, and the holding temperature gradient is adjusted such that the range of a flat region can be changed, and thus the solenoid characteristics (attractive force curve) of the proportional solenoid can be controlled so as to obtain an attractive force curve having a desired flat region.

Effect of the Invention

According to the present invention, as described above, it is possible to provide the proportional solenoid, the breakage of which can be significantly reduced or prevented even when the proportional solenoid is used under high pressure, and capable of obtaining the attractive force curve having the desired flat region, the method for manufacturing the proportional solenoid, and the method for controlling the characteristics of the proportional solenoid to obtain the attractive force curve having the desired flat region.

BRIEF DESCRIPTION OF THE DRAWINGS

FIG. 9($b$) is a diagram illustrating a test piece used for Vickers hardness measurement, X-ray diffraction (XRD) measurement, and FE-SEM measurement.

MODES FOR CARRYING OUT THE INVENTION

An embodiment of the present invention is hereinafter described on the basis of the drawings.

Figure 2:
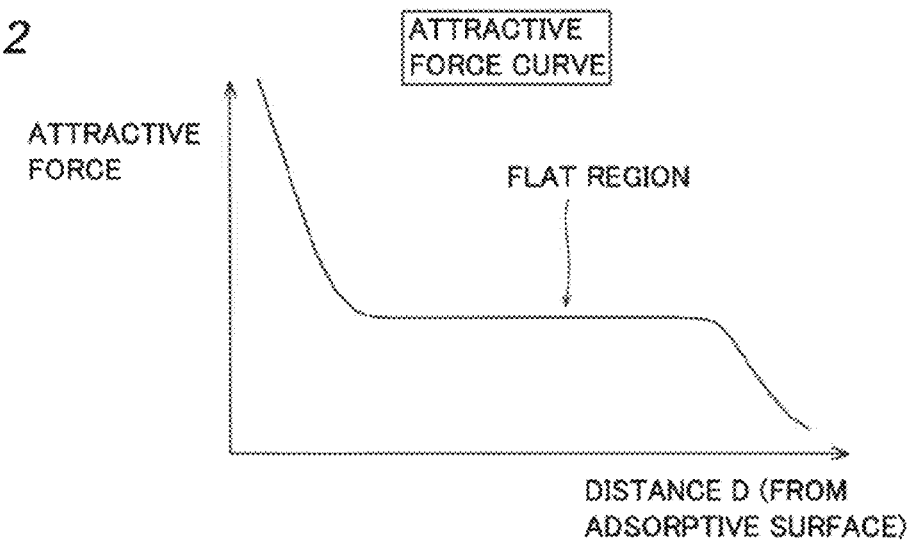
FIG. 2 A diagram showing an attractive force curve of the proportional solenoid according to the embodiment of the present invention.
Figure 3:
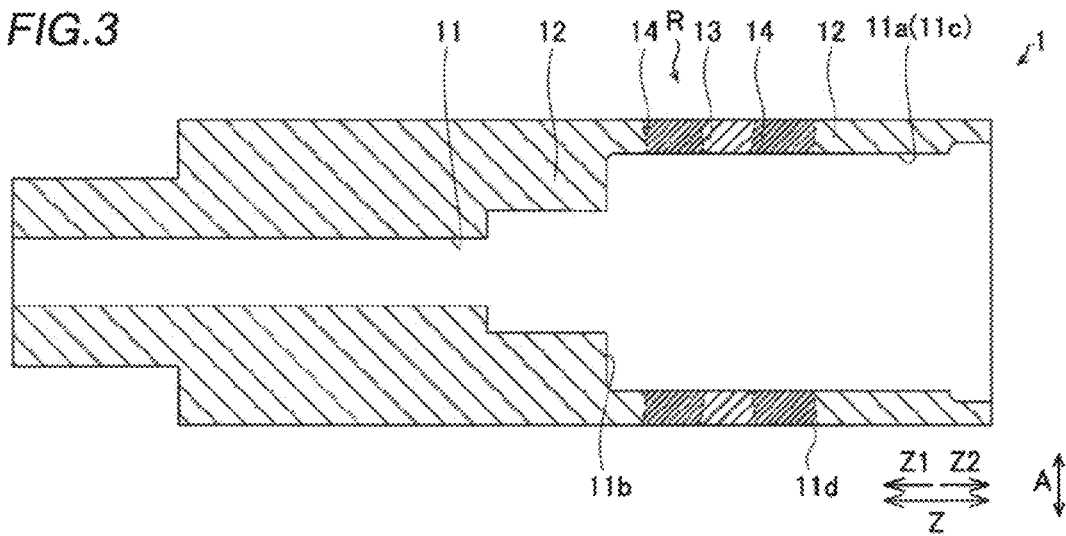
FIG. 3 A sectional view showing a fixed iron core according to the embodiment of the present invention.

A proportional solenoid 100 according to the embodiment of the present invention is now described with reference to FIGS. 1 to 3.

(Configuration of Proportional Solenoid)

Figure 1:
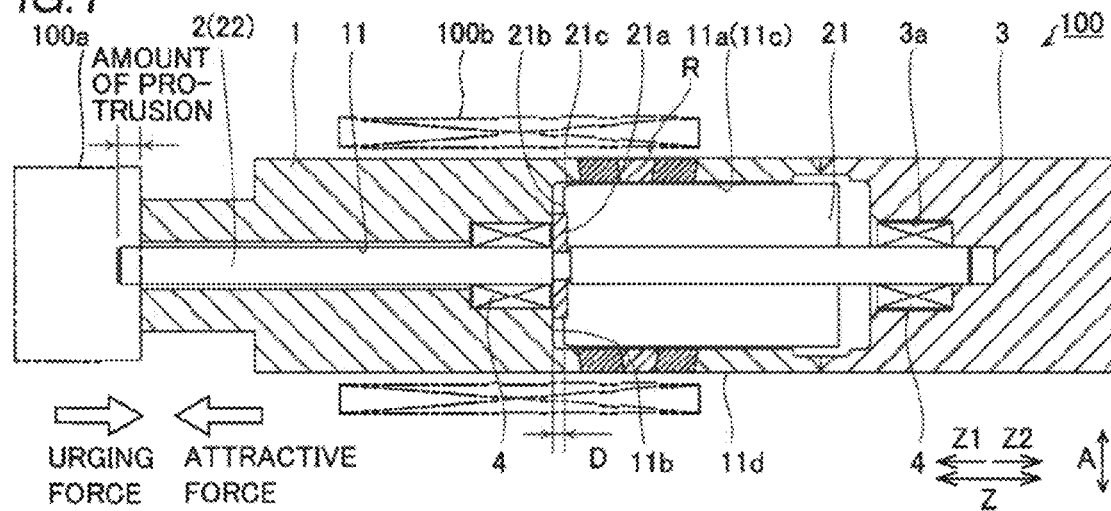
FIG. 1 A sectional view showing a proportional solenoid according to an embodiment of the present invention.

As shown in FIG. 1, the proportional solenoid 100 according to the embodiment of the present invention constitutes a portion of a hydraulic control valve including a hydraulic switch 100$a$ (schematically illustrated by a two-dot chain line in FIG. 1). The proportional solenoid 100 includes a tubular fixed iron core 1 used for a solenoid, a rod assembly 2 inserted into the tubular fixed iron core 1, and rear hardware 3. The fixed iron core 1 is an example of a "tubular member" in the claims. The rod assembly 2 is an example of a "movable magnetic body" in the claims.

The fixed iron core 1 is a tubular member that extends in an axial direction (Z-axis direction). The fixed iron core 1 includes a hole 11 that extends in the Z-axis direction and into which the rod assembly 2 is inserted in such a manner as to be movable in the Z-axis direction. The hole 11 is formed on the Z2 direction side and includes a large storage 11$a$ in a radial direction (A direction) orthogonal to the axial direction. Furthermore, an adsorptive surface 11$b$ that a contact portion 21$a$ (described below) of the rod assembly 2 contacts is provided at an end of the storage 11$a$ on the Z1 direction side. This adsorptive surface 11$b$ is provided substantially parallel to a surface that extends in the A direction orthogonal to the Z-axis direction, and a facing surface 21$b$ (described below) of the rod assembly 2 faces the adsorptive surface 11$b$ in the Z-axis direction. The storage 11$a$ extends in the Z-axis direction on the Z2 direction side. A bearing 4 for correctly holding the position of the rod assembly 2 in the A-axis direction is inserted on the Z1 direction side relative to the adsorptive surface 11$b$ of the hole 11. The configuration of the tubular fixed iron core 1 used for a solenoid is described below in detail.

The rod assembly 2 includes a movable iron core 21 that is large in the A direction and a rod-shaped rod 22 that extends in the Z-axis direction so as to penetrate the movable iron core 21. The movable iron core 21 has a diameter slightly smaller than the diameter of the storage 11$a$. Furthermore, the contact portion 21$a$ that contacts the adsorptive surface 11$b$ is disposed on the end surface (facing surface 21$b$) of the movable iron core 21 on the Z1 direction side. Direct contact between the facing surface 21$b$ of the movable iron core 21 and the adsorptive surface 11$b$ is significantly reduced or prevented by the contact portion 21$a$. In addition, an inclined surface 21$c$ is circumferentially provided at an end of the facing surface 21$b$ of the movable iron core 21 in the A direction. This inclined surface 21$c$ is provided to slightly taper the Z1 direction side of the movable iron core 21. The substantially entire adsorptive surface 11b and the substantially entire facing surface 21b face each other in the Z-axis direction. Thus, it is possible to increase an attractive force that acts between the adsorptive surface 11b and the facing surface 21b.

The rod assembly 2 is made of a nonmagnetic material and a ferromagnet. For example, the rod 22 is made of a nonmagnetic material (such as SUS304), and the movable iron core 21 is made of ferromagnetic carbon steel (such as SUM23).

The rear hardware 3 is connected to the storage 11a and includes a hole 3a into which an end of the rod 22 of the rod assembly 2 on the Z2 direction side is inserted. Furthermore, a bearing 4 is disposed in the hole 3a such that the rod assembly 2 is rotatably supported about its axis. In the proportional solenoid 100, the bearing 4 may not be provided. An end of the rear hardware 3 on the Z1 direction side is joined to an end of the tubular fixed iron core 1 on the Z2 direction side used for a solenoid by welding.

In the proportional solenoid 100, a coil 100b circumferentially surrounds a region of the fixed iron core 1 including at least a heat treatment region R. Furthermore, the fixed iron core 1 is fixed in a state in which the fixed iron core 1 is separated by a predetermined gap from the coil 100b. In the hydraulic switch 100a, a spring (not shown) that generates an urging force in a Z2 direction with respect to the rod assembly 2 is disposed.

In the hydraulic control valve including the proportional solenoid 100, the following operation is performed. First, an electrical current of a predetermined magnitude flows through the coil 100b such that a magnetic field of a predetermined magnitude is generated. By this magnetic field, both the fixed iron core 1 and the movable iron core 21 are magnetized. Consequently, an attractive force acts on the movable iron core 21 such that the movable iron core 21 is attracted to the fixed iron core 1 in a Z1 direction. At this time, as described below in detail, the fixed iron core 1 is heat-treated so as to include a semimagnetic region 14 in which the magnetization decreases in a gentle curve, similarly to a conventional fixed iron core (see FIG. 7) in which a magnetic region is reduced by machining, and thus the attractive force in the Z1 direction that acts on the movable iron core 21 shows an attractive force curve having a flat region in which the attractive force is substantially constant regardless of the position of the movable iron core 21, corresponding to the magnitude of the electrical current that flows through the coil 100b. Thus, in the flat region, an attractive force proportional to the magnitude of the electrical current that flows through the coil 100b can be generated in the rod assembly 2.

In this specification, the expression "the attractive force is substantially constant" indicates that the value of the attractive force is within ±10%. In addition, the term "flat region" refers to a region or the length thereof in which an attractive force at a predetermined position (a position of 1.0 mm from the adsorptive surface 11b in Example described below, for example) in the flat region is used as a reference attractive force and the attractive force is within ±10% of the reference attractive force.

Therefore, as shown in FIG. 1, the magnitude of the electrical current that flows through the coil 100b is changed such that an elastic force in the Z2 direction proportional to the amount of displacement of the spring provided outside the proportional solenoid 100 balances the generated attractive force in the Z1 direction, and thus the facing surface 21b of the movable iron core 21 can be located at a position spaced apart from the adsorptive surface 11b by a predetermined distance D in the Z-axis direction. Consequently, the amount of protrusion of the movable iron core 21 in the hydraulic switch 100a is changed such that the magnitude of the pressure (hydraulic pressure) of oil that flows through the hydraulic switch 100a can be changed.

The proportional solenoid 100 according to this embodiment can be suitably used for applications in which the magnitude of the hydraulic pressure of high-pressure oil of 30 MPa or more and 40 MPa or less, and further 45 MPa or less, for example, is changed, and even if a cycle test in which such a high pressure is repeatedly applied one million times is performed, it does not break. Furthermore, the fixed iron core 1 of the proportional solenoid 100 according to the present invention has sufficient durability without breaking even when a very large pressure of about 150 MPa is applied.

(Structure of Fixed Iron Core)

Figure 4:
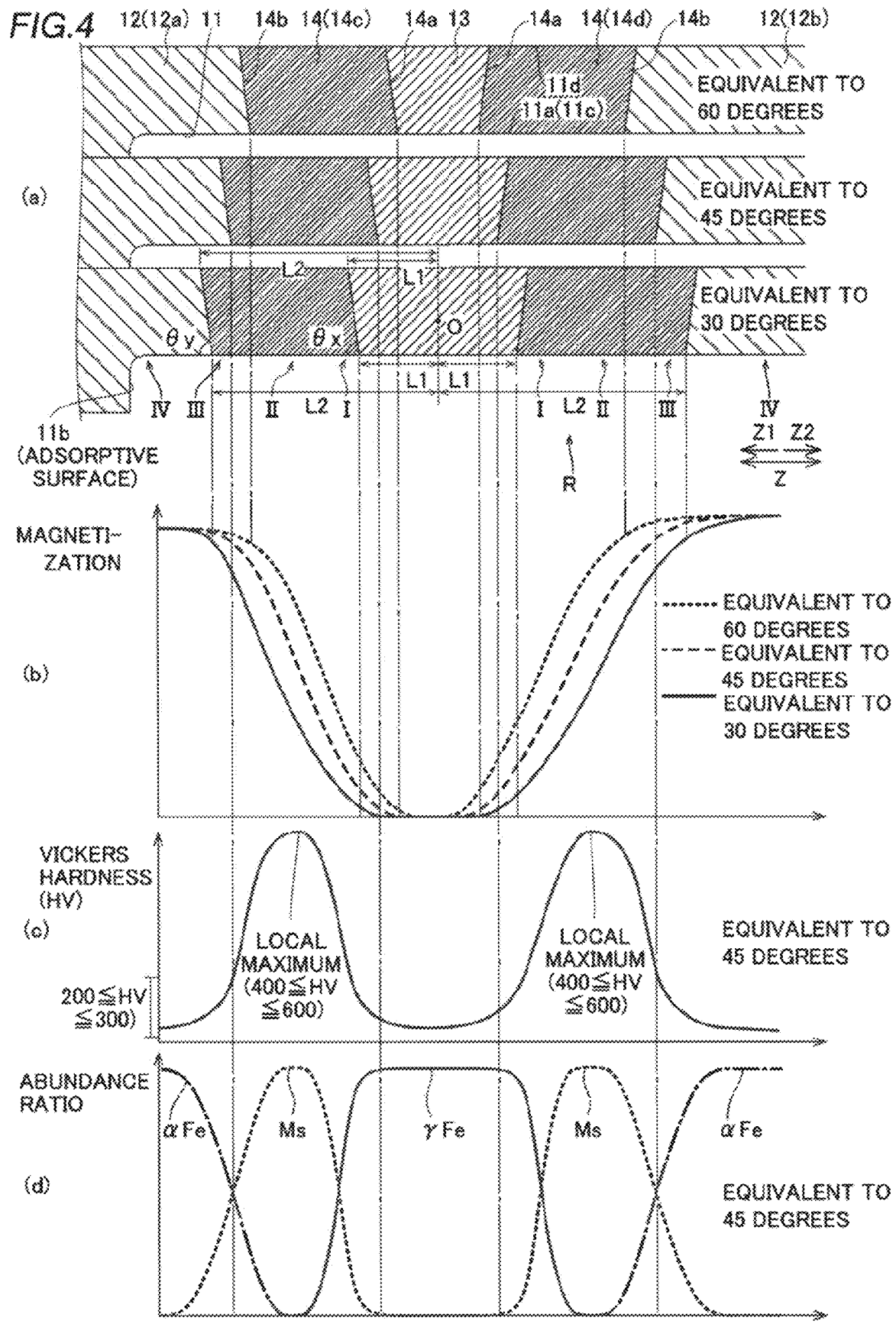
FIG. 4 An enlarged sectional view showing the periphery of a heat treatment region R of the fixed iron core according to the embodiment of the present invention, and a graph showing the magnetization around the heat treatment region R and the abundance ratios of structures.

The structure of the tubular fixed iron core 1 used for a solenoid is described in detail with reference to FIGS. 3 and 4(a) to 4(d). FIG. 3 is a sectional view of the fixed iron core 1 in the Z-axis direction, FIG. 4(a) is an enlarged sectional view around the heat treatment region R of the fixed iron core 1 (the fixed iron core 1 showing solenoid characteristics corresponding to each of taper angles θ of 60 degrees, 45 degrees, and 30 degrees of a comparative example (a proportional solenoid in which tapered surfaces of a magnetic portion and a nonmagnetic portion formed by machining are butt-joined to each other) from above), FIG. 4(b) is a diagram showing the magnetization of each fixed iron core 1 shown in FIG. 4(a), FIG. 4(c) shows the Vickers hardness (HV) of the fixed iron core 1 showing solenoid characteristics corresponding to a taper angle θ of 45 degrees of the comparative example, and FIG. 4(d) is a diagram showing the abundance ratio of each structure of the fixed iron core 1 showing solenoid characteristics corresponding to a taper angle θ of 45 degrees of the comparative example.

As shown in FIGS. 3 and 4(a) to 4(d), the fixed iron core 1 is made of a composite magnetic material including a magnetic region 12 mainly including a ferrite structure (α-Fe phase), which is a ferromagnet, a nonmagnetic region 13 mainly including an austenite structure (γ-Fe phase), which is a nonmagnetic material, and the semimagnetic region 14 formed between the magnetic region 12 and the nonmagnetic region 13 and including a martensite structure (Ms phase), which is a ferromagnet. The magnetic region 12 is a region easily magnetized by an external magnetic field, and the nonmagnetic region 13 is a region hardly magnetized by an external magnetic field. A boundary 14a between the semimagnetic region 14 and the nonmagnetic region 13 is a position at which the martensite structure starts to exist in the Z1 direction or the Z2 direction from the nonmagnetic region 13. A boundary 14b between the semimagnetic region 14 and the magnetic region 12 is a position at which the abundance ratio of the martensite structure becomes equal to the abundance ratio of the ferrite structure. The abundance ratio of the martensite structure is larger on the semimagnetic region 14 side than on the boundary 14b, and the abundance ratio of the ferrite structure is larger on the magnetic region 12 side than on the boundary 14b. The position of each region in FIG. 4(a) substantially corresponds to a magnetization value shown in FIG. 4(b).

The nonmagnetic region 13 and the semimagnetic region 14 are provided in the heat treatment region R formed on the Z1 direction side (adsorptive surface 11b side) of the storage 11a. The magnetic region 12 is provided in a region other than the heat treatment region R. The heat treatment region R is provided at a position spaced apart in the Z2 direction from the adsorptive surface 11b. Moreover, the heat treatment region R is formed entirely in the A direction from the inner surface 11c of the tubular fixed iron core 1 used for a solenoid to the outer surface 11d thereof. As described above, the boundary 14b between the semimagnetic region 14 and the magnetic region 12 is the position at which the abundance ratio of the martensite structure becomes equal to the abundance ratio of the ferrite structure, the martensitic structure slightly exists in the magnetic region 12 near the boundary 14b, and the magnetic region 12 near the boundary 14b is affected by heat treatment. However, for the sake of clarity, in this specification, the nonmagnetic region 13 and the semimagnetic region 14 are regarded as the heat treatment region R. Furthermore, in this specification, the expression that the magnetic region 12 "mainly includes a ferrite structure" indicates that most regions that are not affected by the heat treatment include substantially only the ferrite structure, and even in a portion that is affected by the heat treatment, the ferrite structure is 50% or more. In addition, the expression that the nonmagnetic region 13 "mainly includes an austenite structure" indicates that the nonmagnetic region 13 substantially includes the austenite structure, and no ferrite structure or martensite structure exists.

The magnetic region 12, the nonmagnetic region 13, and the semimagnetic region 14 are continuously and integrally formed along the Z-axis direction in the same fixed iron core 1 without having joint portions. That is, the magnetic region 12, the nonmagnetic region 13, and the semimagnetic region 14 are continuously and integrally formed without performing joining processing such as welding and brazing. Heat treatment by high-frequency heating is performed on the composite magnetic material that constitutes the fixed iron core 1 and can form the magnetic region 12 mainly including the ferrite structure and the nonmagnetic region 13 mainly including the austenite structure such that the magnetic region 12, the nonmagnetic region 13, and the semimagnetic region 14 are continuously and integrally formed. Consequently, unlike a fixed iron core having joint portions, even when the proportional solenoid 100 is used for applications in which the magnitude of the hydraulic pressure of high-pressure oil of 30 MPa or more is changed, the fixed iron core 1 according to this embodiment has sufficient durability. Moreover, no compound resulting from buildup welding or the like is formed at the boundary between the magnetic region 12 and the semimagnetic region 14, for example, and thus it is possible to significantly reduce or prevent changes in magnetic characteristics due to the compound. The specific composition of the composite magnetic material that constitutes the fixed iron core 1 is described below.

A pair of semimagnetic regions 14 are formed so as to sandwich the nonmagnetic region 13 in the Z-axis direction. That is, the semimagnetic region 14 includes a first semimagnetic region 14c located on the adsorptive surface 11b side relative to the nonmagnetic region 13, and a second semimagnetic region 14d located on the side opposite to the adsorptive surface 11b relative to the nonmagnetic region 13. A pair of magnetic regions 12 are formed so as to sandwich the nonmagnetic region 13 and the semimagnetic region 14 (heat treatment region R) in the Z-axis direction. That is, the magnetic region 12 includes a first magnetic region 12a including the adsorptive surface 11b and located on the adsorptive surface 11b side relative to the first semimagnetic region 14c, and a second magnetic region 12b located on the side opposite to the adsorptive surface 11b relative to the second semimagnetic region 14d. Heat conduction differs in the Z-axis direction depending on the shape of the fixed iron core 1 at the time of heat treatment, and thus the respective regions do not necessarily have to be formed structurally symmetrically in the Z-axis direction. For example, distances L1 (described below) on the Z1 direction side and the Z2 direction side may be different from each other while distances L2 (described below) on the Z1 direction side and the Z2 direction side may be different from each other. Among the first magnetic region 12a, the first semimagnetic region 14c, the second magnetic region 12b, and the second semimagnetic region 14d, only the first magnetic region 12a and the first semimagnetic region 14c are mainly involved in solenoid characteristics (attractive force curve) required for the proportional solenoid 100.

As shown in FIG. 4(c), the fixed iron core 1 is produced in such a manner that hardness distribution varies from region to region, and specifically the Vickers hardness (HV) is in the range of $200 \leq HV \leq 600$. Furthermore, the fixed iron core 1 is produced in such a manner that in the magnetic region 12 and the nonmagnetic region 13, the Vickers hardness (HV) is $200 \leq HV \leq 300$, and in the semimagnetic region 14, the local maximum of the Vickers hardness (HV) is $400 \leq HV \leq 600$.

In this embodiment, the semimagnetic region 14 (the first semimagnetic region 14c and the second semimagnetic region 14d) has such a gentle magnetic gradient that the magnetization increases from the nonmagnetic region 13 toward the magnetic region 12 (the first magnetic region 12a and the second magnetic region 12b). Furthermore, as shown in FIG. 4(c), the semimagnetic region 14 has such a hardness gradient that the hardness increases from the nonmagnetic region 13 toward the magnetic region 12 on the nonmagnetic region 13 side of the semimagnetic region 14. This shows that the abundance ratio of the austenite structure having a relatively low hardness (Vickers hardness (HV) of about 200 to 300) as mechanical strength decreases, and the abundance ratio of the martensite structure having a relatively high hardness (Vickers hardness (HV) of about 400 or more) increases. The semimagnetic region 14 has such a hardness gradient that the hardness decreases from the nonmagnetic region 13 toward the magnetic region 12 on the magnetic region 12 side of the semimagnetic region 14. This shows that the abundance ratio of the martensite structure having a relatively high hardness decreases, and the abundance ratio of the ferrite structure having a relatively low hardness (Vickers hardness (HV) of about 200 to 300) increases. That is, the semimagnetic region 14 has such a hardness gradient that the hardness increases from the nonmagnetic region 13 toward the magnetic region 12, the local maximum of the Vickers hardness (HV) reaches 400 or more, and then the hardness decreases.

The above change in Vickers hardness HV supports the following description of the abundance ratios of the structures. That is, as shown in FIG. 4(d), on the nonmagnetic region 13 side of the semimagnetic region 14, the abundance ratio of the nonmagnetic austenite structure (γ-Fe phase) decreases from the nonmagnetic region 13 toward the magnetic region 12, and the abundance ratio of the ferromagnetic martensite structure (Ms phase) increases from the nonmagnetic region 13 toward the magnetic region 12. On the magnetic region 12 side of the semimagnetic region 14, the abundance ratio of the martensite structure decreases from the nonmagnetic region 13 toward the magnetic region 12, and the abundance ratio of the ferrite structure (a-Fe phase) more ferromagnetic than the martensite structure increases from the nonmagnetic region 13 toward the magnetic region 12. This indicates that the local maximum of the abundance ratio of the martensite structure exists in the semimagnetic region 14. Due to this structure configuration in which the nonmagnetic austenite structure is changed to the ferrite structure while the martensite structure with slightly lower magnetization than the ferrite structure abundantly exists, the semimagnetic region 14 has such a gentle magnetic gradient that the magnetization increases from the nonmagnetic region 13 toward the magnetic region 12, as shown in FIG. 4(b). Consequently, in the semimagnetic region 14, the magnetization corresponding to a region in which the tapered surface of the prior art is formed can be generated. The semimagnetic region 14 is appropriately changed such that the proportional solenoid 100 according to this embodiment can obtain substantially the same solenoid characteristics (attractive force curve) as those of the proportional solenoid of the comparative example in which the tapered surfaces of the magnetic portion and the nonmagnetic portion formed by machining are butt-joined to each other.

The amount of carbides in each structure is as follows. As described below, the composite magnetic material that constitutes the fixed iron core 1 (a tubular member 101 described below) before the heat treatment contains 0.3 mass % or more and 1.2 mass % or less of carbon. 0.3 mass % or more and 1.2 mass % or less of carbon is only slightly dissolved in the ferrite structure, and thus in the magnetic region 12 to which heat by high-frequency heating described below is not substantially applied, carbon that has not been dissolved is present as carbides, and a large amount of carbides is detected. On the other hand, in a region to which heat is applied by high-frequency heating, carbides (carbon) are dissolved in the structure to form an austenite structure, and thus there is no or very little carbide present in the nonmagnetic region 13. In the martensite structure, a portion of carbon is dissolved, and the rest is precipitated as carbides. Therefore, the semimagnetic region 14 has less carbide than the magnetic region 12 and more carbide than the nonmagnetic region 13. That is, the carbides present in the semimagnetic region 14 including the ferrite structure, the martensite structure, and the austenite structure are more than the carbides present in the nonmagnetic region 13 mainly including the austenite structure, and are less than the carbides present in the magnetic region 12 mainly including the ferrite structure. Furthermore, the aforementioned structure configuration in which the local maximum of the martensite structure exists in the semimagnetic region 14 indicates that the carbides present in the semimagnetic region 14 gradually decrease from the magnetic region 12 toward the nonmagnetic region 13.

The semimagnetic region 14 is configured in such a manner that a distance L1 between the center O of the nonmagnetic region 13 in the Z-axis direction and an end (boundary 14a) of the semimagnetic region 14 on the nonmagnetic region 13 side increases from the inner surface 11c toward the outer surface 11d. Furthermore, the semimagnetic region 14 is configured in such a manner that a distance L2 between the center O of the nonmagnetic region 13 in the Z-axis direction and an end (boundary 14b) of the semimagnetic region 14 on the magnetic region 12 side increases from the inner surface 11c toward the outer surface 11d.

When an angle defined by the boundary 14a between the nonmagnetic region 13 and the semimagnetic region 14 and the inner surface 11c of the fixed iron core 1 is θx (substantially corresponding to the taper angle θ of the conventional proportional solenoid), the angle θx conceivably has a small correlation with the magnitude of the taper angle θ of the proportional solenoid of the comparative example having the corresponding solenoid characteristics. On the other hand, the distances L1 corresponding to the distance of the nonmagnetic region 13 in the Z-axis direction conceivably have a correlation with the taper angle θ of the proportional solenoid of the corresponding comparative example. Specifically, the distances L1 corresponding to the distance of the nonmagnetic region 13 in the 2-axis direction tend to decrease as the taper angle θ of the corresponding comparative example increases. Furthermore, the semimagnetic region 14 is formed at a position spaced apart from the adsorptive surface 11b in the Z-axis direction. That is, the end (boundary 14b) of the semimagnetic region 14 on the Z1 direction side is located at the position spaced apart from the adsorptive surface 11b in the Z-axis direction.

(Composition of Composite Magnetic Material)

The composition of the composite magnetic material that constitutes the tubular fixed iron core 1 used for a solenoid is now described.

The composite magnetic material that constitutes the fixed iron core 1 is an iron alloy containing 0.3 mass % or more and 1.2 mass % or less of C (carbon). The composite magnetic material that constitutes the fixed iron core 1 is preferably an iron alloy containing 0.3 mass % or more and 1.2 mass % or less of C, 0.1 mass % or more and 3 mass % or less of Si (silicon), 0.1 mass % or more and 4 mass % or less of Mn (manganese), 4 mass % or less of Ni (nickel), 4 mass % or more and 20 mass % or less of Cr (chromium), 2 mass % or less of Al (aluminum), a balance Fe (iron), and inevitable impurities. The composite magnetic material is more preferably an iron alloy containing 0.30 mass % or more and 1.20 mass % or less of C, 0.10 mass % or more and 3.0 mass % or less of Si (silicon), 0.10 mass % or more and 4.0 mass % or less of Mn (manganese), 4.0 mass % or less of Ni (nickel), 4.0 mass % or more and 20.0 mass % or less of Cr (chromium), 2.0 mass % or less of Al (aluminum), a balance Fe (iron), and inevitable impurities. Hereinafter, the content percentage "%" of an element denotes "mass %".

C: 0.30% or More and 1.20% or Less

C is an effective element for forming the nonmagnetic region 13 as an austenite forming element. When C is less than 0.30%, it is difficult to stably form the nonmagnetic region 13. When C exceeds 1.20%, the workability of the composite magnetic material (fixed iron core 1) decreases. Thus, the content percentage of C is 0.30% or more and 1.20% or less.

Si: 0.10% or More and 3.0% or Less

Si is an element that has effects of improving soft magnetic properties and reducing a coercive force in the composite magnetic material. When Si is less than 0.10%, the effect of improving the soft magnetic properties is small, and when Si exceeds 3.0%, the workability of the composite magnetic material (fixed iron core 1) decreases. Thus, the content percentage of Si is preferably 0.10% or more and 3.0% or less. A more preferable range of the content percentage of Si is 0.30% or more and 2.5% or less.

Mn: 0.10% or More and 4.0% or Less

Mn is an effective element for forming the nonmagnetic region 13 as an austenite forming element. When Mn is less than 0.10%, the effect of forming the nonmagnetic region 13 is small, and when Mn exceeds 4.0%, the workability of the composite magnetic material (fixed iron core 1) decreases. Thus, the content percentage of Mn is preferably 0.10% or more and 4.0% or less.

Ni: 4.0% or Less

Ni is an effective element for forming the nonmagnetic region 13 as an austenite forming element. When Ni exceeds 4.0%, the workability of the composite magnetic material (fixed iron core 1) significantly decreases. Thus, the content percentage of Ni is preferably 4.0% or less. Ni is relatively expensive, and thus it may not be included in the composite magnetic material.

Cr: 4.0% or More and 20.0% or Less

Cr is an element that has effects of improving the corrosion resistance of the composite magnetic material and increasing the electrical resistivity. Furthermore, Cr has an effect of stabilizing the austenite structure of the nonmagnetic region 13. When Cr is less than 4.0%, the effects of improving the corrosion resistance, increasing the electrical resistivity, and stabilizing the austenite structure are small. When Cr exceeds 20.0%, the saturation magnetization of the composite magnetic material significantly decreases, and the workability of the composite magnetic material (fixed iron core 1) decreases. Thus, the content percentage of Cr is preferably 4.0% or more and 20.0% or less.

Al: 2.0% or Less

Al is an element that has effects of improving soft magnetic properties and reducing a coercive force in the composite magnetic material. When Al exceeds 2.0%, inclusions are formed, and the workability of the composite magnetic material (fixed iron core 1) decreases. Thus, the content percentage of Al is preferably 2.0% or less. Al forms inclusions as described above, and thus Al may not be included in the composite magnetic material.

Inevitable Impurities

The inevitable impurities include elements such as P (phosphorus), S (sulfur), O (oxygen), and N (nitrogen). These impurity elements may each be contained in a range of 0.1% or less as a range that does not affect the magnetic characteristics and the workability of the composite magnetic material.

(Method for Manufacturing Composite Magnetic Material)

A method for manufacturing the composite magnetic material that constitutes the fixed iron core 1 is now briefly described.

The raw materials weighed so as to be in the above composition range are vacuum-dissolved, and then are cast using a mold to produce a steel ingot. Then, the steel ingot is heated to a predetermined temperature (about 1000° C.) and forged, and then is heated to a predetermined temperature (about 1000° C.) and hot-rolled. Thus, a hot-rolled material having a predetermined thickness is produced. Then, the hot-rolled material is polished and cleaned, for example, and then is annealed (about 900° C.) under an inert atmosphere. Finally, cold rolling is performed to produce a rod-shaped composite magnetic material mainly including a ferrite structure.

(Method for Manufacturing Proportional Solenoid)

A method for manufacturing the proportional solenoid 100 is now described with reference to FIGS. 1 and 4 to 6.

Figure 5:
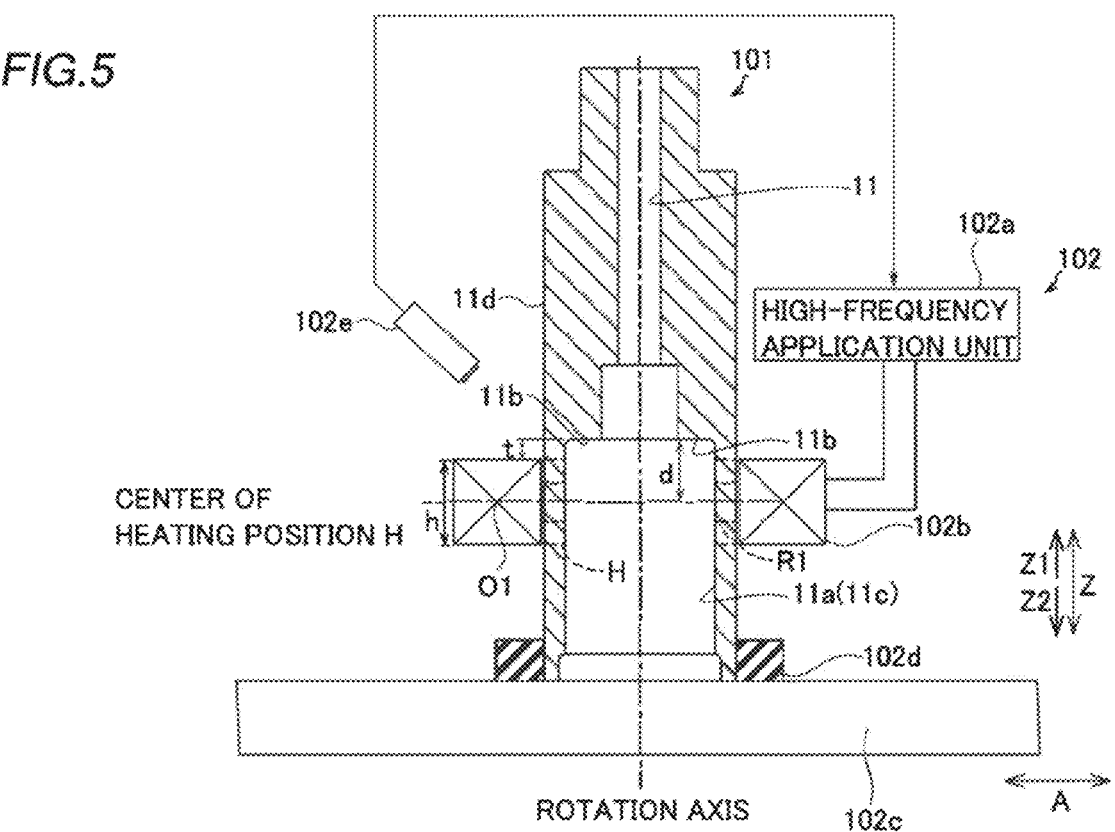
FIG. 5 A schematic view illustrating a method for manufacturing the fixed iron core according to the embodiment of the present invention.

First, as shown in FIG. 5, a tubular member 101 is prepared using the aforementioned rod-shaped composite magnetic material. At this point, the heat treatment region R (see FIG. 4) is not formed in the tubular member 101, and the entire tubular member 101 mainly includes a ferrite structure.

Figure 6:
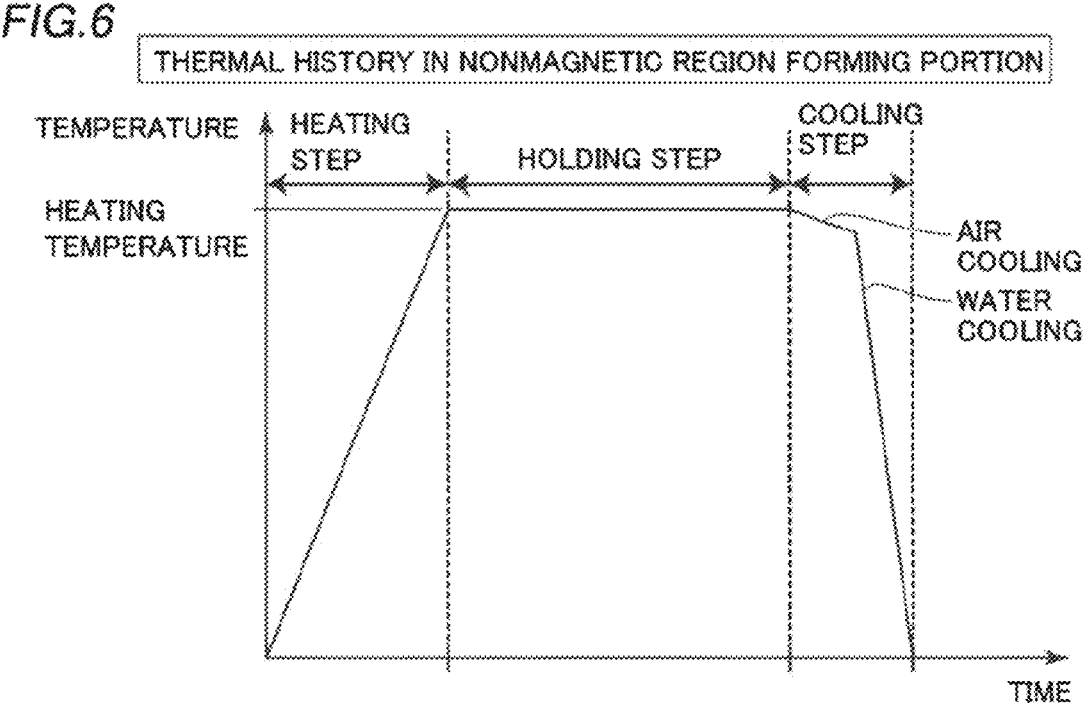
FIG. 6 A graph showing a thermal history applied to a nonmagnetic region forming portion of the fixed iron core according to the embodiment of the present invention.

As a heating step shown in FIG. 6, a high-frequency induction heater 102 is used to perform high-frequency heat treatment on the tubular member 101. The high-frequency induction heater 102 includes a high-frequency application unit 102a, a high-frequency coil 102b, a rotary stage 102c, a fixing jig 102d, and a radiation thermometer 102e. The high-frequency application unit 102a has a function of controlling the amount of alternating current flowing through the high-frequency coil 102b. The rotary stage 102c has a function of rotating around a rotation axis at a predetermined rotation speed. The fixing jig 102d has a function of fixing the tubular member 101 onto the rotary stage 102c.

The radiation thermometer 102e has a function of measuring the temperature of a heat-treated portion in a non-contact manner. In order to perform accurate temperature measurement using the radiation thermometer 102e, it is preferable to apply a blackbody paint (such as JSC3 manufactured by Japan Sensor Corporation) to the outer surface of the tubular member 101. Furthermore, it is preferable to calibrate the radiation thermometer 102e in advance by measuring the temperature using a thermocouple capable of measuring the temperature more accurately and the radiation thermometer 102e and comparing the temperature data of the thermocouple and the temperature data of the radiation thermometer 102e (when the temperature is measured by the thermocouple, the tubular member 101 may not be rotated). Thus, it is possible to measure the exact temperature in a non-contact manner by the radiation thermometer 102e. In addition, it is possible to more accurately measure the temperature of the heat-treated portion by confirming the thermal behavior of the tubular member 101 with thermal analysis by a simulation.

As a specific high-frequency heating method, first, the tubular member 101 is placed on the rotary stage 102c in such a manner that a direction in which a rotation axis extends coincides with the Z-axis direction in which the tubular member 101 extends. Then, the tubular member 101 is fixed onto the rotary stage 102c by the fixing jig 102d.

Thereafter, the high-frequency coil 102b is arranged in such a manner as to circumferentially surround a heating position H (a region that faces the high-frequency coil 102b) of the tubular member 101 including a nonmagnetic region forming portion R1. The thickness h of the high-frequency coil 102b in the Z-axis direction may be appropriately selected according to the dimensions of the heat treatment region R and the nonmagnetic region forming portion R1 in the Z-axis direction. At this time, the high-frequency coil 102b is arranged in such a manner that an adsorptive surface 11b of the tubular member 101 and an end of the high-frequency coil 102b on the adsorptive surface 11b side (Z1 direction side) are separated from each other in the Z-axis direction. Accordingly, the periphery (a portion in which the semimagnetic region 14 is formed) of the nonmagnetic region forming portion R1 in which the end of the high-frequency coil 102b is located can be spaced apart from the adsorptive surface 11b, and thus the magnetic region 12 can be ensured between the semimagnetic region 14 and the adsorptive surface 11b. Consequently, in the proportional solenoid 100, an attractive force curve in which a flat region is formed can be obtained.

Specifically, the high-frequency coil 102b is preferably arranged in such a manner that a distance t between the adsorptive surface 11b and the end of the high-frequency coil 102b on the adsorptive surface 11b side is 1 mm or more and 3 mm or less, and the high-frequency coil 102b is more preferably arranged in such a manner that the distance t is 1.5 mm or more and 2.5 mm or less. The center O1 of the high-frequency coil 102b in the Z-axis direction is the center of the heating position H in the Z-axis direction, which is heated by the high-frequency coil 102b. For example, when the thickness h is 10 mm, the center of the heating position H is preferably located at a position away from the adsorptive surface 11b of the tubular member 101 by a distance d of 6 mm or more and 8 mm or less, and is more preferably located at a position away by a distance d of 6.5 mm or more and 7.5 mm or less.

The heat treatment region R is a region slightly larger in the Z-axis direction than the heating position H while the nonmagnetic region forming portion R1 is a region smaller in the Z-axis direction than the heating position H, and these positions can be changed by changing the heating position H (moving the heating position H in the Z-axis direction). Thus, the positional relationship between the rod assembly 2 (movable iron core 21) and the magnetic region 12, the nonmagnetic region 13, and the semimagnetic region 14 can be varied. Consequently, the heating position H is changed such that it is possible to change the range size (solenoid characteristics) of the flat region of the attractive force curve in the proportional solenoid 100.

Then, while the tubular member 101 is rotated at the predetermined rotation speed (200 rpm, for example) by the rotary stage 102c, an alternating current is caused to flow through the high-frequency coil 102b with a predetermined electrical current amount and frequency. Thus, the nonmagnetic region forming portion R1 and the vicinity (heating position H) thereof are rapidly heated from the outside of the tubular member 101 (heating step). At this time, the frequency is a high frequency of 40 kHz or more and 80 kHz or less, for example. Furthermore, the amount of alternating current flowing through the high-frequency coil 102b is changed such that a heating rate at least in the nonmagnetic region forming portion R1 is 100° C./second or more (preferably 150° C./second or more) and 250° C./second or less (preferably 200° C./second or less).

In the range of the heating rate described above, it is easy to form an unstable structure in which carbides remain in addition to a nonmagnetic austenite structure by the heat treatment on the side on which the heating rate is low. That is, the semimagnetic region 14 is easily formed by rapid cooling after the heat treatment, and the fixed iron core 1 (proportional solenoid 100) having an attractive force curve in which the range of the flat region is small is easily obtained. Specifically, in the case of a heating rate of 100° C./second or more and 170° C./second or less, a proportional solenoid 100 corresponding to a conventional proportional solenoid having a taper angle θ of less than 45 degrees is easily obtained.

On the side on which the heating rate is high, it is difficult to form an unstable structure in which carbides remain in addition to a nonmagnetic austenite structure by the heat treatment. That is, the semimagnetic region 14 is not easily formed by rapid cooling after the heat treatment, and the fixed iron core 1 (proportional solenoid 100) having an attractive force curve in which the range of the flat region is large is easily obtained. Specifically, in the case of a heating rate of more than 170° C./second and 250° C./second or less, a proportional solenoid 100 corresponding to a conventional proportional solenoid having a taper angle θ of 45 degrees or more is easily obtained.

In this specification, instead of the expression that it is easy to form an unstable structure in which carbides remain in addition to a nonmagnetic austenite structure by the heat treatment, and the semimagnetic region 14 is easily formed by rapid cooling after the heat treatment, the simple expression that the semimagnetic region 14 is easily formed may be used. Furthermore, the characteristics of the proportional solenoid of the present invention will be discussed with reference to the taper angle θ of the conventional (comparative example) proportional solenoid, but that only means that the solenoid characteristics correspond to a conventional proportional solenoid having a predetermined taper angle θ. That is, that does not mean that the angle θx (see FIG. 4) defined by the boundary between the nonmagnetic region 13 and the semimagnetic region 14 and the inner surface 11c of the fixed iron core 1 (see FIG. 4) and an angle θy defined by a boundary between the semimagnetic region 14 and the magnetic region 12 and the inner surface 11c of the fixed iron core 1 (see FIG. 4) in the proportional solenoid 100 of the present invention are the same as the taper angle θ of the corresponding conventional (comparative example) proportional solenoid.

In the heating step, the nonmagnetic region forming portion R1 (heating position H) is heated until a heating temperature in the nonmagnetic region forming portion R1 reaches 1000° C. or higher and 1300° C. or lower. It is easy to form the semimagnetic region 14 on the side on which the heating temperature is higher in the heating temperature range, and thus the fixed iron core 1 (proportional solenoid 100) having an attractive force curve in which the range of the flat region is small is easily obtained. That is, a proportional solenoid 100 corresponding to a conventional proportional solenoid having a taper angle θ of less than 45 degrees is easily obtained, for example. Moreover, it is difficult to form the semimagnetic region 14 on the side on which the heating temperature is lower, and thus the fixed iron core 1 (proportional solenoid 100) having an attractive force curve in which the range of the flat region is large is easily obtained. That is, a proportional solenoid 100 corresponding to a conventional proportional solenoid having a taper angle θ of 45 degrees or more is easily obtained, for example.

Then, after the heating temperature in the nonmagnetic region forming portion R1 reaches 1000° C. or more and 1300° C. or less, the heated state of the nonmagnetic region forming portion R1 (heating position H) is held for a holding time of 5 seconds or more and 20 seconds or less (holding step). In order to reliably conduct heat in the thickness direction (radial direction) of the tubular member 101 and form the nonmagnetic region 13, the holding time is preferably 10 seconds or more, and more preferably more than 10 seconds. In order to reliably significantly reduce or prevent heat conduction to a portion (a portion in which the magnetic region 12 is located) excluding the heat treatment region R, the holding time is preferably 15 seconds or less. It is easy to form the semimagnetic region 14 on the side on which the holding time is longer in the holding time range, and thus the fixed iron core 1 (proportional solenoid 100) having an attractive force curve in which the range of the flat region is small is easily obtained. That is, a proportional solenoid 100 corresponding to a conventional proportional solenoid having a taper angle θ of less than 45 degrees is easily obtained, for example. Furthermore, it is difficult to form the semimagnetic region 14 on the side on which the holding time is shorter, and thus the fixed iron core 1 (proportional solenoid 100) having an attractive force curve in which the range of the flat region is large is easily obtained. That is, a proportional solenoid 100 corresponding to a conventional proportional solenoid having a taper angle θ of 45 degrees or more is easily obtained, for example.

In the holding step shown in FIG. 6, it is preferable to change the amount of alternating current flowing through the high-frequency coil 102b such that the holding temperature gradient of at least the nonmagnetic region forming portion R1 falls within a holding temperature gradient range of −20° C./second or more and 5° C./second or less. It is more preferable to change the amount of alternating current flowing through the high-frequency coil 102b such that the holding temperature gradient of at least the nonmagnetic region forming portion R1 falls within a holding temperature gradient range of −15° C./second or more and 0° C./second or less. It is still more preferable to change the amount of alternating current flowing through the high-frequency coil 102b such that the holding temperature gradient of at least the nonmagnetic region forming portion R1 falls within a holding temperature gradient range of −10° C./second or more and 0° C./second or less.

The amount of alternating current flowing through the high-frequency coil 102b in the holding step is smaller than the amount of alternating current flowing through the high-frequency coil 102b in the heating step. When the holding temperature gradient is brought close to 0° C./second (or 5° C./second), the semimagnetic region 14 is easily formed, and thus the fixed iron core 1 (proportional solenoid 100) having an attractive force curve in which the range of the flat region is small is easily obtained. That is, a proportional solenoid 100 corresponding to a conventional proportional solenoid having a taper angle θ of less than 45 degrees is easily obtained, for example. When the holding temperature gradient is reduced (brought closer to −10° C./second (or −20° C./second)), the semimagnetic region 14 is not easily formed, and thus the fixed iron core 1 (proportional solenoid 100) having an attractive force curve in which the range of the flat region is large is easily obtained. That is, a proportional solenoid 100 corresponding to a conventional proportional solenoid having a taper angle θ of 45 degrees or more is easily obtained, for example. Although an example in which the amount of electrical current is changed as described above is described as means for controlling the holding temperature gradient, the holding temperature gradient can also be controlled by causing cooling water having an adjusted flow rate or the like to flow inside the tubular member 101 during heating of the nonmagnetic region forming portion R1 of the tubular member 101, for example, in addition to changing the amount of electrical current.

By the above heat treatment, the ferromagnetic ferrite structure is transformed into an austenite structure in the nonmagnetic region forming portion R1, and the carbides contained in the composite magnetic material are completely dissolved in the austenite structure. This austenite structure is thermally stable, and thus a nonmagnetic austenite structure is stably formed in the nonmagnetic region forming portion R1. Furthermore, in the periphery of the nonmagnetic region forming portion R1 (the periphery of the nonmagnetic region 13; positions indicated by "I" in FIG. 4), in addition to the nonmagnetic austenite structure, an unstable structure in which carbides (mainly $M_{23}C_6$, where M is metal forming the composite magnetic material, such as Fe) remain is formed. In the vicinity of the nonmagnetic region forming portion R1, the amount of heat conduction is large, and thus the amount of unstable structure formation decreases. On the other hand, as a distance from the nonmagnetic region forming portion R1 increases, the amount of heat conduction decreases, and the amount of unstable structure formation increases.

On the other hand, at positions spaced apart from the nonmagnetic region forming portion R1 (positions indicated by "II" in FIG. 4), a stable austenite structure is not formed, and only an unstable structure is formed. Furthermore, at positions spaced farther apart from the nonmagnetic region forming portion R1 (positions indicated by "III" in FIG. 4), the heat of the nonmagnetic region forming portion R1 is not sufficiently conducted, and an unstable structure is formed only in part whereas the ferrite structure remains in the remaining portion. In addition, at positions sufficiently away from the nonmagnetic region forming portion R1 (positions indicated by "IV" in FIG. 4), transformation from the ferrite structure to the austenite structure does not occur.

After the holding time has elapsed, the tubular member 101 is rapidly cooled by stopping the electrical current flowing through the high-frequency coil 102b and dipping the tubular member 101 in a water tank (not shown) in the vicinity of the high-frequency induction heater 102 (a water cooling step shown in FIG. 6). The term "rapid cooling" refers to a cooling rate of 150° C./second or more. Depending on the size of the water tank, the temperature of the cooling water may be room temperature. Air cooling is performed after the electrical current to the high-frequency coil 102b is stopped until the tubular member 101 is dipped in the water tank. When the air cooling time is long, the attractive force curve tends to decrease as a whole, and thus the shorter the air cooling time is, the better it is. The air cooling time is within 5 seconds, and specifically about 0.5 seconds or more and 5 seconds or less. A rapid cooling method is not limited to water cooling. For example, the heated tubular member may be rapidly cooled by oil cooling.

The stable austenite structure capable of maintaining its structure even after rapid cooling is formed in the nonmagnetic region forming portion R1, and thus the nonmagnetic region 13 (see FIG. 4(a)) mainly including the nonmagnetic austenite structure is formed in the nonmagnetic region forming portion R1.

On the other hand, the unstable structure around the nonmagnetic region forming portion R1 (at the positions indicated by "I" in FIG. 4(a)) is transformed into a martensite structure by rapid cooling. Thus, the semimagnetic region 14 is formed. In the semimagnetic region 14 in the vicinity of the nonmagnetic region 13, there are few unstable structures, and thus the amount of formation of the martensite structure obtained by transformation decreases. On the other hand, the unstable structure increases as a distance from the nonmagnetic region 13 increases, and thus the amount of formation of the martensite structure obtained by transformation increases. Consequently, as shown in FIG. 4(d), on the nonmagnetic region 13 side of the semimagnetic region 14, the abundance ratio of the austenite structure decreases from the nonmagnetic region 13 toward the magnetic region 12, and the abundance ratio of the martensite structure increases from the nonmagnetic region 13 toward the magnetic region 12.

At the positions spaced farther apart from the nonmagnetic region 13 (the positions indicated by "III" in FIG. 4(a)) in the semimagnetic region 14, the unstable structure formed only in part is transformed into a martensite structure, and coexists with the ferrite structure. At the positions spaced farther apart from the nonmagnetic region 13 in the semimagnetic region 14, the unstable structure decreases toward the magnetic region 12, and thus on the magnetic region 12 side of the semimagnetic region 14, the abundance ratio of the martensite structure decreases from the nonmagnetic region 13 toward the magnetic region 12 while the abundance ratio of the ferrite structure increases from the nonmagnetic region 13 toward the magnetic region 12.

On the semimagnetic region 14 side of the magnetic region 12, the abundance ratio of the martensite structure is equal to or less than the abundance ratio of the ferrite structure, and at the positions sufficiently away from the nonmagnetic region forming portion R1 (the positions indicated by "IV" in FIG. 4), no transformation into a martensite structure occurs, and thus only the ferrite structure exists.

The nonmagnetic region forming portion R1 and its periphery are heated from the outside of the tubular member 101 such that the outer surface 11d side of the tubular member 101 is more affected by heat than the inner surface 11c side of the tubular member 101. Therefore, the semimagnetic region 14 is conceivably configured in such a manner that from the inner surface 11c toward the outer surface 11d, the distance L1 between the center O of the nonmagnetic region 13 in the Z-axis direction and the end (boundary 14a) of the semimagnetic region 14 on the nonmagnetic region 13 side and the distance L2 between the center O of the nonmagnetic region 13 in the Z-axis direction and the end (boundary 14b) of the semimagnetic region 14 on the magnetic region 12 side increase.

However, the boundary 14a is the position at which the martensite structure starts to exist in a region in which the structure continuously changes from the nonmagnetic region 13 to the semimagnetic region 14 and further to the magnetic region 12, and thus when the angle defined by the boundary 14a between the nonmagnetic region 13 and the semimagnetic region 14 and the inner surface 11c of the tubular member 101 is θx (corresponding to the taper angle θ of the conventional proportional solenoid), for example, it is difficult to correctly identify the boundary 14a and measure the angle θx. However, as shown in Example 8a to Example 8c described below, when observation is performed by a simple method, in comparison of proportional solenoids having the similar characteristics to those of the conventional proportional solenoid with the conventional proportional solenoid, the angle θx has no correlation with the magnitude of the taper angle θ, and seems to be about 70 degrees or more and 85 degrees or less. This indicates that the solenoid characteristics (attractive force curve) of the proportional solenoid 100 of the present invention are not determined by the taper angle θ between the magnetic portion and the nonmagnetic portion unlike the conventional proportional solenoid, but the structure change of the tubular member 101 brought by various condition settings in the method for manufacturing the proportional solenoid 100 of the present invention greatly contributes to the solenoid characteristics, and it is not assumed at all from the conventional solenoid manufacturing method (Patent Document 3, for example). The distances L1 corresponding to the distance of the nonmagnetic region 13 in the Z-axis direction conceivably have a correlation with the corresponding taper angle θ. Specifically, the distances L1 tend to decrease as the corresponding taper angle θ increases.

Thus, the tubular fixed iron core 1 used for a solenoid including the semimagnetic region 14 having such a gentle magnetic gradient that the magnetization increases from the nonmagnetic region 13 toward the magnetic region 12 and such a hardness gradient that the hardness increases and then decreases, the magnetic region 12, and the nonmagnetic region 13 is produced.

As described in detail above, at least one of the heating rate, the heating temperature, the holding time, and the holding temperature gradient is appropriately changed within the above range such that the distribution of the magnetic characteristics of the fixed iron core 1 can be changed (controlled) to the distribution of desired magnetic characteristics. Thus, it is possible to obtain an attractive force curve having desired solenoid characteristics such as the length of the flat region. Furthermore, the heating position H is changed such that the solenoid characteristics of the fixed iron core 1 can be changed (controlled) to desired solenoid characteristics. Among these, in the above range, the holding temperature gradient is changed such that the attractive force curve of the proportional solenoid 100 can be changed most greatly. Moreover, although it is inferior to the case in which the holding temperature gradient is changed, the heating rate is changed such that the attractive force curve of the proportional solenoid 100 can be greatly changed. Furthermore, the amount of change is the smallest when the holding time and the heating position H are changed. Therefore, when the attractive force curve of the proportional solenoid 100 is to be changed greatly, the holding temperature gradient, for example, is changed, and when the attractive force curve of the proportional solenoid 100 is to be changed slightly, the holding time and the heating position H are changed such that it is possible to obtain a desired attractive force curve. That is, at least one or any combination of the heating rate, the heating temperature, the holding time, the heating position H, and the holding temperature gradient is changed such that a desired attractive force curve can be obtained in the proportional solenoid 100.

Thereafter, in a state in which the rod assembly 2 movable in the Z-axis direction and the bearing 4 as necessary are inserted into the tubular fixed iron core 1 used for a solenoid including the magnetic region 12, the semimagnetic region 14, and the nonmagnetic region 13, the rear hardware 3 is welded to an end of the fixed iron core 1 on the Z2 direction side. Thus, the proportional solenoid 100 is produced.

First Example

A first example is now described with reference to FIGS. 1, 5, and 7 to 9. In the first example, a proportional solenoid 100 of Example 1 corresponding to the aforementioned embodiment and having a similar attractive force curve (solenoid characteristics) to that of Comparative Example 1 with a taper angle θ of 45 degrees was produced, the attractive force curve thereof was measured, the magnetization and the Vickers hardness of a fixed iron core 1 were measured, and the crystal structure was analyzed.

(Proportional Solenoid of Example 1)

First, by the manufacturing method of the aforementioned embodiment, a proportional solenoid 100 including the tubular fixed iron core 1 used for a solenoid of Example 1 was produced. Specifically, a tubular member 101 was produced using a rod-shaped composite magnetic material made of a Fe—Cr—Ni—Mn—Al—C alloy (YEP-FA1, manufactured by Hitachi Metals, Ltd.). Then, high-frequency heat treatment was performed on the tubular member 101, which was the fixed iron core 1 before the heat treatment, by a high-frequency induction heater 102 including a high-frequency coil 102b having a thickness h (see FIG. 5) of 10 mm in a Z-axis direction.

Specifically, the high-frequency coil 102b was arranged in such a manner that an adsorptive surface 11b of the tubular member 101 and an end of the high-frequency coil 102b on the adsorptive surface 11b side were separated from each other by a distance t (see FIG. 5) of 2.5 mm in the Z-axis direction. That is, the high-frequency coil 102b was arranged in such a manner that the center O1 (see FIG. 5) of the high-frequency coil 102b in the Z-axis direction was located at the center of a heating position H in the Z-axis direction spaced apart by a distance d (see FIG. 5) of 7.5 mm in the Z-axis direction from the adsorptive surface 11b of the tubular member 101. The thickness (=(outer diameter−inner diameter)/2) of the fixed iron core 1 at the heating position H was 2.4 mm.

Then, an alternating current was caused to flow through the high-frequency coil 102b at 40 kHz while the tubular member 101 was rotated at 200 rpm by a rotary stage 102c. In addition, the amount of alternating current flowing through the high-frequency coil 102b was adjusted to 80 A such that a rate of temperature increase, which was a heating rate in a nonmagnetic region forming portion R1, was 190° C./second.

Then, after the heating temperature in the nonmagnetic region forming portion R1 reached 1250° C., the heated state of the nonmagnetic region forming portion R1 was held for a holding time of 10 seconds. In this holding step, the amount of alternating current flowing through the high-frequency coil 102b was adjusted to 55 A such that a holding temperature rate indicating the holding temperature gradient of the nonmagnetic region forming portion R1 was 0° C./second. Then, after the holding time elapsed, the tubular member 101 was rapidly cooled by stopping the electrical current flowing through the high-frequency coil 102b and dipping the tubular member 101 in a water tank (not shown) in the vicinity of the high-frequency induction heater 102. Thus, the tubular fixed iron core 1 of Example 1 was produced. The time (air cooling time) from the stopping of the electrical current to the dipping in the water tank was about 2 seconds.

Then, in a state in which a rod assembly 2 made of SUM23 (carbon steel) (movable iron core 21) and SUS304 (rod 22) and a bearing 4 were inserted into the tubular fixed iron core 1 used for a solenoid so as to be movable in an axial direction, rear hardware 3 was welded to an end of the fixed iron core 1 on the Z2 direction side. Thus, the proportional solenoid 100 including the fixed iron core 1 of Example 1 was produced.

Figure 7:
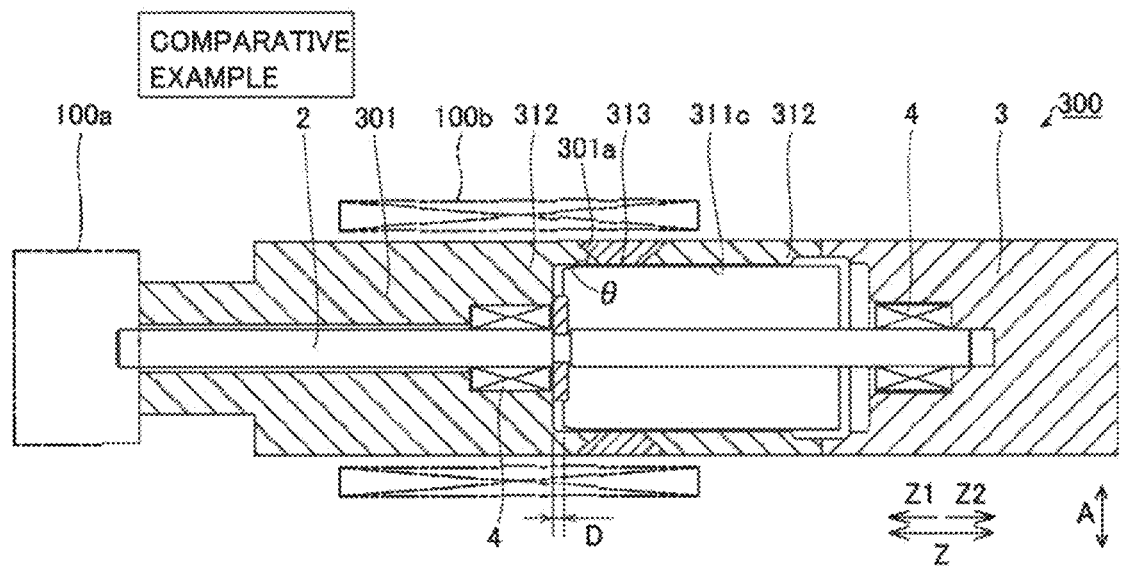
FIG. 7 A sectional view showing a proportional solenoid of a comparative example.

A proportional solenoid 300 including a tubular fixed iron core 301 used for a solenoid of Comparative Example 1 shown in FIG. 7 was produced. Specifically, the tubular fixed iron core 301 including a magnetic portion 312 made of the same rod-shaped composite magnetic material as that used for the fixed iron core 1 of Example 1 and a nonmagnetic portion 313 made of SUS304 (conforming to JIS standards) was produced. In the tubular fixed iron core 301 of Comparative Example 1, the magnetic portion 312 and the nonmagnetic portion 313 were braze-joined to each other in such a manner that a taper angle θ defined by a tapered joint surface 301a and the inner surface 311c of the fixed iron core 301 was 45 degrees. Then, in a state in which the same rod assembly 2 as in Example 1 was inserted into the fixed iron core 301 so as to be movable in an axial direction, rear hardware 3 was welded to an end of the fixed iron core 301 on the Z2 direction side. Thus, the proportional solenoid 300 including the fixed iron core 301 of Comparative Example 1 was produced.

(Attractive Force Measurement)

Then, using the proportional solenoids 100 and 300 of Example 1 and Comparative Example 1, attractive force measurement was performed. Specifically, the fixed iron core 1 (301) and a coil 100b were fixed in a state in which the coil 100b was arranged so as to radially surround a predetermined region of the tubular fixed iron core 1 (301) used for a solenoid. As the coil 100b, a coil having a rectangular section with a wire diameter of 0.48 mm, a number of turns of 560, and a resistance value of 5.38Ω was used. Then, an attractive force at a distance D from the adsorptive surface 11b generated when an electrical current of 1.4 A was caused to flow through the coil and a magnetic field was generated was measured. At this time, the attractive force was measured using a load cell (LCE-A-500N, manufactured by KYOWA ELECTRONIC INSTRUMENTS Co., Ltd.). Furthermore, the distance D (stroke length) from the adsorptive surface 11b was measured using a displacement sensor head (ZX-LD40, manufactured by OMRON Corporation) and an amplifier (ZX-LD11N 2M, manufactured by OMRON Corporation). The measurement results are shown in TABLE 1 and FIG. 8.

TABLE 1

| DISTANCE D (mm) | ATTRACTIVE FORCE (N) OF EXAMPLE 1 | ATTRACTIVE FORCE (N) OF COMPARATIVE EXAMPLE 1 | RELATIVE RATIO (%) |
| --- | --- | --- | --- |
| 0.0 (ADSORPTIVE SURFACE) | 36.2 | 33.7 | 7.6 |
| 0.5 | 30.1 | 28.8 | 4.3 |
| 1.0 (REFERENCE POSITION) | 28.1 | 27.5 | 2.2 |
| 1.5 | 27.0 | 27.6 | 1.1 |
| 2.0 | 27.6 | 28.1 | 1.8 |
| 2.5 | 26.0 | 27.9 | 6.6 |
| 3.0 | 23.0 | 25.9 | 11.2 |

Figure 8:
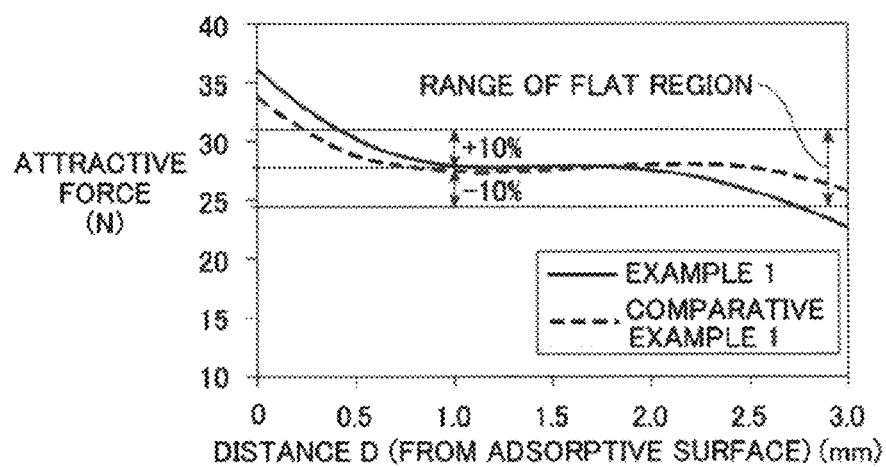
FIG. 8 A graph showing attractive force curves of Example 1 and Comparative Example 1 in a first example of the present invention.
Figure 9:
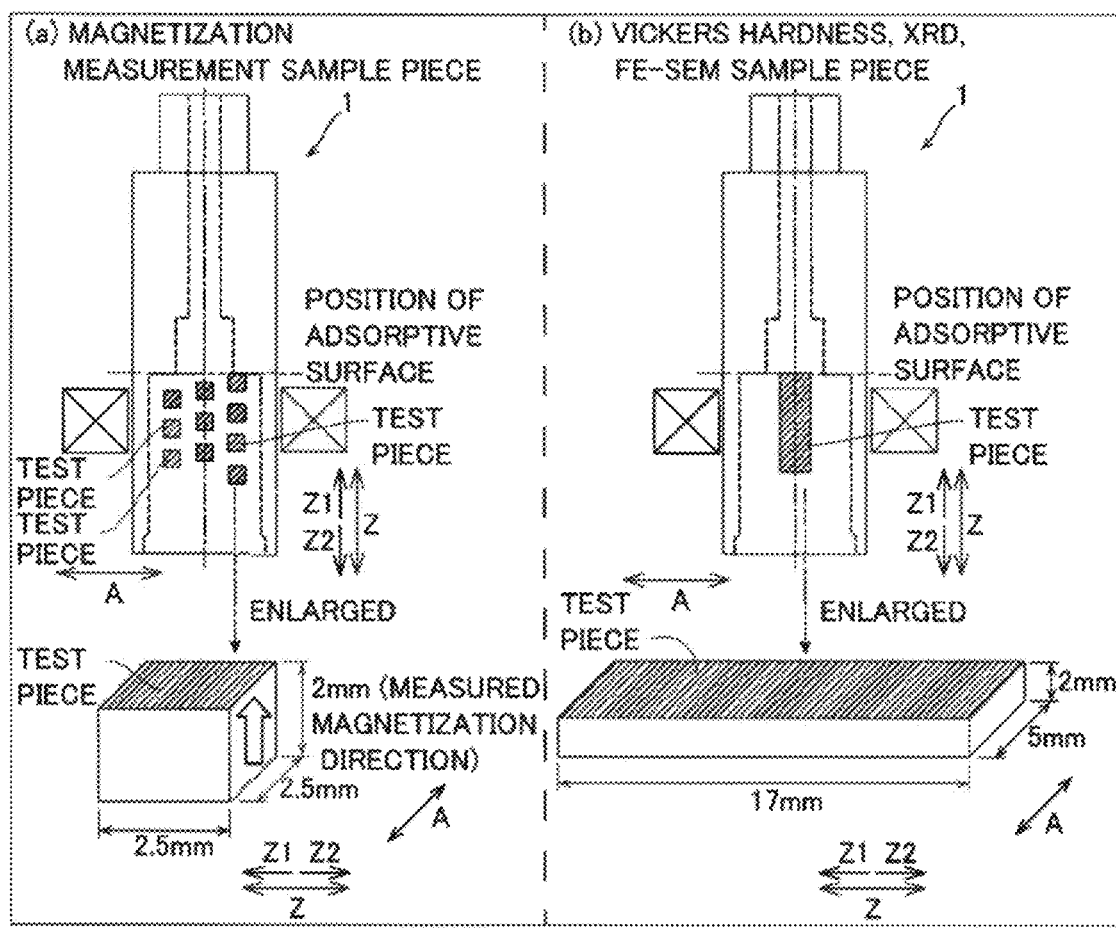
FIG. 9($a$) is a diagram illustrating test pieces used for magnetization measurement.

As shown in TABLE 1 and FIG. 8, the results of the attractive force measurement were obtained that the relative ratio of the attractive force of the proportional solenoid 100 of Example 1 to the attractive force of the proportional solenoid 300 of Comparative Example 1 (=attractive force of Example 1−attractive force of Comparative Example 1/attractive force of Comparative Example 1×100) (%) was 10% or less in a range where the distance D was 2.5 mm or less, as shown in TABLE 1. In particular, the attractive force of the proportional solenoid 100 of Example 1 was within ±10% of an attractive force at a position at which the distance D is 1.0 mm in the range where the distance D is 0.5 mm to 2.5 mm and had a flat region of 2.0 mm or more, and the relative ratio between the attractive force at 0.0 mm and the attractive force at a boundary between the flat region and a region other than the flat region in Example 1 (0.5 mm and 2.5 mm in TABLE 1, for example) was 10% or less, and thus it has been confirmable that the proportional solenoid 100 of Example 1 exhibits substantially the same performance as the proportional solenoid 300 of Comparative Example 1.

Consequently, it has been confirmable that a proportional solenoid having a similar attractive force curve (solenoid characteristics) to that of Comparative Example 1 having a taper angle θ of 45 degrees can be produced by the heat treatment. Furthermore, the fixed iron core 1 of Example 1 does not have a joint portion by brazing or the like, and thus unlike the fixed iron core 301 of Comparative Example 1, the fixed iron core 1 of Example 1 can conceivably withstand high pressure without breaking even when used for applications in which high pressure is applied, as shown in Example 4a to Example 4c described below.

(Magnetization and Vickers Hardness Measurement)

Next, the magnetization and the Vickers hardness as an example of hardness as mechanical strength were measured for the tubular fixed iron core 1 used for a solenoid of Example 1. Specifically, a test piece of 2.5 mm (Z-axis direction)×2.5 mm (A direction)×2 mm (thickness direction) was cut out at each of a total of eleven measurement positions, and the magnetization characteristics were measured using a vibrating sample magnetometer (VSM-5-20, manufactured by Toei Industry Co., Ltd.). More specifically, as shown in FIG. 9(a), in a state in which surfaces of the test pieces on the adsorptive surface side were respectively located at the position of the adsorptive surface 11b and positions spaced apart in the Z-axis direction from the adsorptive surface 11b by 1.7 mm, 2.7 mm, 4.0 mm, 6.6 mm, 7.5 mm, 8.9 mm, 11.7 mm, 12.9 mm, 13.8 mm, and 16 mm, the test pieces were cut out. The thickness direction of each of the test pieces having a thickness of 2 mm was taken as a measured magnetization direction (illustrated by a white arrow in FIG. 9(a)). The magnetization when an externally applied magnetic field was set to 0.4 MA/m at a maximum and a magnetic field of 0.4 MA/m was applied was defined as the magnetization of the test piece. Moreover, magnetization measurement was performed with a measurement mode of a full loop and a measurement temperature of 23° C. The measurement results are shown in TABLE 2 and FIG. 10.

At a measurement position, a test piece of 17.0 mm (Z-axis direction)×5.0 mm (A direction)×2.0 mm (thickness direction) was cut out, and the Vickers hardness was measured using a micro Vickers hardness meter (HMV-1AD, manufactured by Shimadzu Corporation). Specifically, as shown in FIG. 9(b), the test piece was cut out in a state in which a surface of the test piece on the adsorptive surface side was located at the position of the adsorptive surface 11b. Then, the outer peripheral surface (surface in which hatching is formed in FIG. 9(b)) side of the cut-out board was mirror-finished, and the Vickers hardness was measured at intervals of 0.5 mm in the Z-axis direction. As the measurement conditions, a test force of 4.903 N and a load time of 15 seconds were used. The measurement results are shown in FIG. 10.

TABLE 2

| DISTANCE D (mm) | MAGNETIZATION (T) | MAGNETISM |
|---|---|---|
| 0.0 (ADSORPTIVE SURFACE) | 1.41 | FERROMAGNETIC |
| 2.7 | 1.06 | SEMIMAGNETIC |
| 7.5 | 0.002 | NONMAGNETIC |
| 12.9 | 0.82 | SEMIMAGNETIC |
| 1.6 | 1.41 | FERROMAGNETIC |

Figure 10:
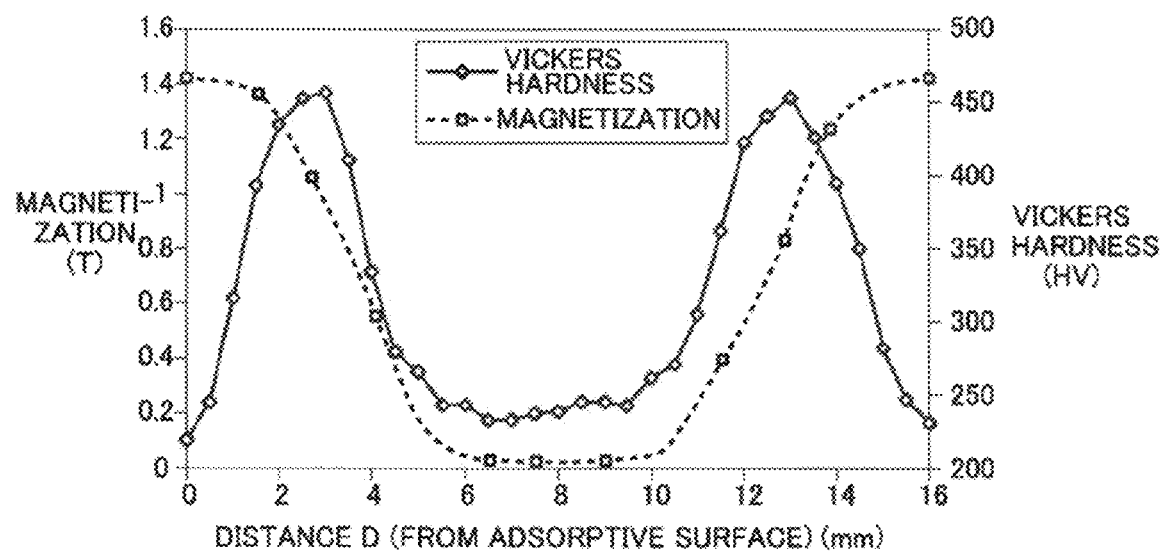
FIG. 10 A graph showing the measurement results of the magnetization and the Vickers hardness of Example 1 in the first example of the present invention.

As shown in TABLE 2 and FIG. 10, the results of the magnetization measurement and the Vickers hardness measurement were obtained that in the nonmagnetic region forming portion R1 (nonmagnetic region 13) in the vicinity of the center of the heating position H (a distance D from the adsorptive surface 11b=7.5 mm), the magnetization was sufficiently reduced to 0.01 T or less, and the Vickers hardness was reduced to about HV220. Thus, it has been confirmable that the nonmagnetic region 13 mainly includes an austenite structure that is nonmagnetic and has a relatively small Vickers hardness. A distance D of 0.0 mm in TABLE 2 corresponds to a distance D of 0 mm from the adsorptive surface indicated by the horizontal axis in FIG. 9, and distances D in TABLE 2 correspond to distances D from the adsorptive surface indicated by the horizontal axis in FIG. 9.

On the other hand, as a distance from the nonmagnetic region forming portion R1 (nonmagnetic region 13) increased, the magnetization increased, and the Vickers hardness increased to about HV450. Thus, it has been confirmable that on the nonmagnetic region 13 side of the semimagnetic region 14, the abundance ratio of the austenite structure decreases from the nonmagnetic region 13 toward the magnetic region 12, and the abundance ratio of the martensite structure, which is ferromagnetic and has a large Vickers hardness, increases from the nonmagnetic region 13 toward the magnetic region 12.

As a distance from the nonmagnetic region forming portion R1 (nonmagnetic region 13) further increased, the magnetization increased slightly, and the Vickers hardness decreased to about HV220. Thus, it has been confirmable that on the magnetic region 12 side of the semimagnetic region 14, the abundance ratio of the martensite structure decreases from the nonmagnetic region 13 toward the magnetic region 12, and the abundance ratio of the ferrite structure, which is ferromagnetic and has a relatively small Vickers hardness, increases.

Consequently, it has been confirmable that the semimagnetic region 14 has such a magnetic gradient that the magnetization increases from the nonmagnetic region 13 toward the magnetic region 12, and in the semimagnetic region 14, such a hardness gradient that the hardness (Vickers hardness) increases and then decreases is obtained, i.e. the semimagnetic region 14 has the local maximum of the Vickers hardness, and the semimagnetic region 14 has the local maximum of the abundance ratio of the martensite structure.

(Analysis of Crystal Structure)

Each of the magnetic region 12, the semimagnetic region 14, and the nonmagnetic region 13 of the tubular fixed iron core 1 used for the proportional solenoid 100 of Example 1 was analyzed by X-ray diffraction.

Specifically, similarly to the aforementioned Vickers hardness measurement, a test piece (see FIG. 9(b)) of 17.0 mm (Z-axis direction)×5.0 mm (A direction)×2.0 mm (thickness direction) was cut out, and X-ray diffraction measurement (XRD measurement) was performed at the position (magnetic region 12) of the adsorptive surface 11b, a position (semimagnetic region 14) of 2 mm from the adsorptive surface 11b, and a position (nonmagnetic region 13) of 8 mm from the adsorptive surface 11b. For the measurement, an X-ray diffractometer (SmartLab, manufactured by Rigaku Corporation) was used, an X-ray source was a Cu ray, a detector was a semiconductor detector, and a scan mode was 2θ/θ.

Figure 11:
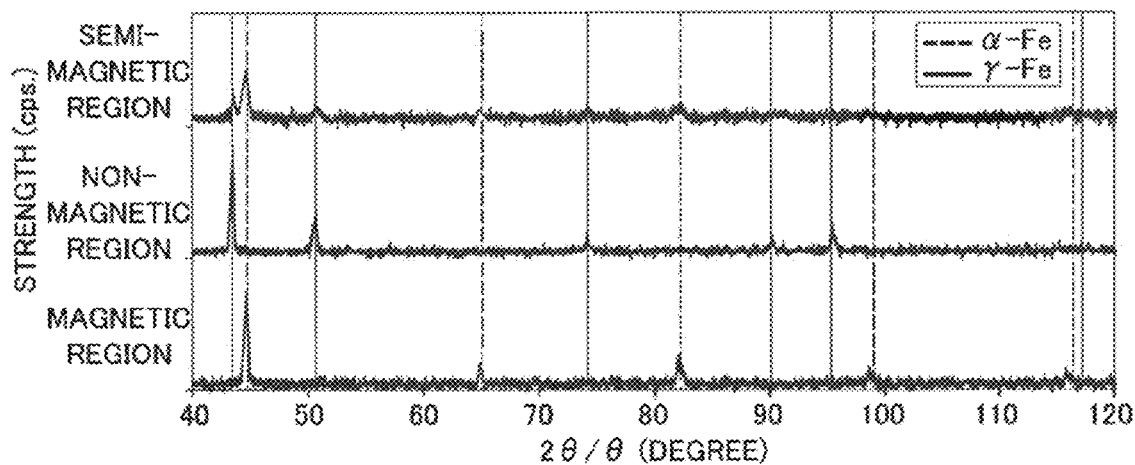
FIG. 11 A graph showing the X-ray diffraction results of Example 1 in the first example of the present invention.

The measurement results are shown in FIG. 11. In FIG. 11, a peak position based on the ferrite structure (α-Fe) is shown by a dotted line, and a peak position based on the austenite structure (γ-Fe) is shown by a solid line. An α-Fe peak was observed in the magnetic region 12, and a γ-Fe peak was observed in the nonmagnetic region 13. From these, it has been confirmable that the magnetic region 12 and the nonmagnetic region 13 mainly include a ferrite structure and an austenite structure, respectively. Furthermore, in the semimagnetic region 14, both α-Fe and γ-Fe peaks were observed.

Figure 12:
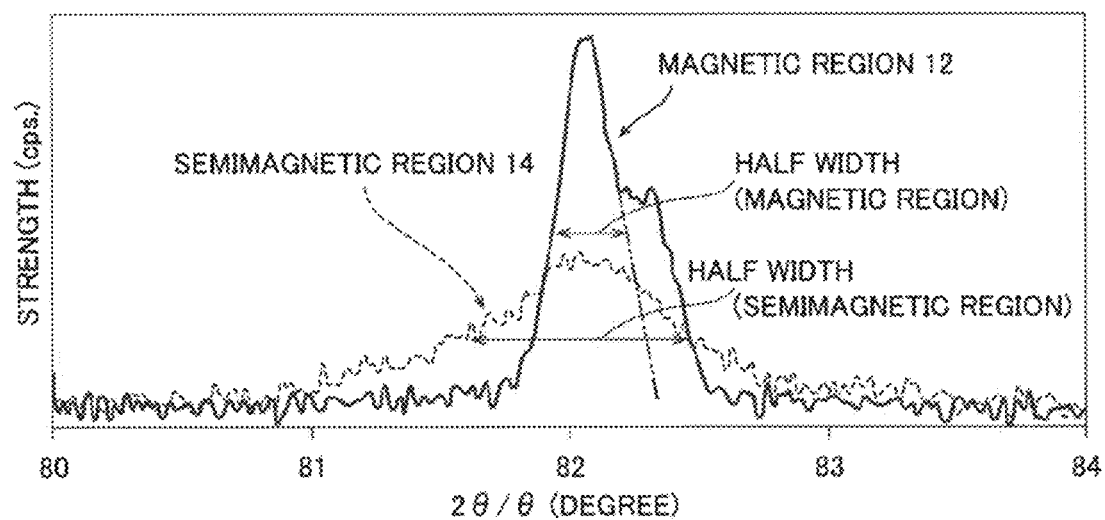
FIG. 12 An enlarged graph showing the vicinity of $2\theta/\theta=82$ degrees in the graph of a semimagnetic region and a magnetic region in FIG. 11.

Next, in order to confirm whether or not a martensite structure is present in the semimagnetic region 14, a (211) plane (2θ/θ is near 82 degrees) of a crystal was locally measured at the positions of the magnetic region 12 and the semimagnetic region 14. The results are shown in FIG. 12. The peak position of the semimagnetic region 14 did not change from the peak position of the magnetic region 12 (ferrite structure). That is, the semimagnetic region 14 was not peak-shifted. Furthermore, the half width at the peak of the semimagnetic region 14 was larger than the half width at the peak of the magnetic region 12. These are characteristics found in the X-ray diffraction of the martensite structure. From these results, it has been confirmable that the martensitic structure is present in the semimagnetic region 14.

When the Vickers hardness measurement results and the X-ray diffraction measurement results are combined, it has been confirmable that in the semimagnetic region 14, the ferrite structure, the martensite structure, and the austenite structure are present, and the semimagnetic region 14 has the local maximum of the martensite structure.

Second Example

A second example is now described. In the second example, a proportional solenoid 100 of Example 2 corresponding to the aforementioned embodiment and having a similar attractive force curve (solenoid characteristics) to that of Comparative Example 2 with a taper angle θ of 30 degrees was produced, the attractive force curve thereof was measured.

(Proportional Solenoid of Example 2)

First, by the manufacturing method of the aforementioned embodiment, a proportional solenoid 100 including a tubular fixed iron core 1 used for a solenoid of Example 2 was produced. In Example 2, a high-frequency coil 102b was arranged in such a manner that an adsorptive surface 11b of a tubular member 101, which is a pretreated fixed iron core, and an end of a high-frequency coil 102b on the adsorptive surface 11b side (Z1 direction side) were separated from each other by a distance t of 1.5 mm in a Z-axis direction. That is, the high-frequency coil 102b was arranged in such a manner that the center O1 of the high-frequency coil 102b in the Z-axis direction was located at the center of a heating position H in the Z-axis direction spaced apart by a distance d of 6.5 mm in the Z-axis direction from the adsorptive surface 11b of the tubular member 101. Furthermore, after a heating temperature in a nonmagnetic region forming portion R1 reached 1250° C., the heated state of the nonmagnetic region forming portion R1 was held for a holding time of 15 seconds. Except for these, the proportional solenoid 100 including the tubular fixed iron core 1 of Example 2 was produced in the same manner as in Example 1 described above. That is, in a method for manufacturing the fixed iron core 1 of Example 2, the heating position H and the holding time are different from those in the method for manufacturing the fixed iron core 1 of Example 1.

Moreover, a proportional solenoid 300 including a tubular fixed iron core 301 used for a solenoid of Comparative Example 2 shown in FIG. 7 was produced. Specifically, except that a magnetic portion 312 and a nonmagnetic portion 313 were braze-joined such that the taper angle θ was 30 degrees, the proportional solenoid 300 including the fixed iron core 301 of Comparative Example 2 was produced in the same manner as in Comparative Example 1 described above.

Figure 13:
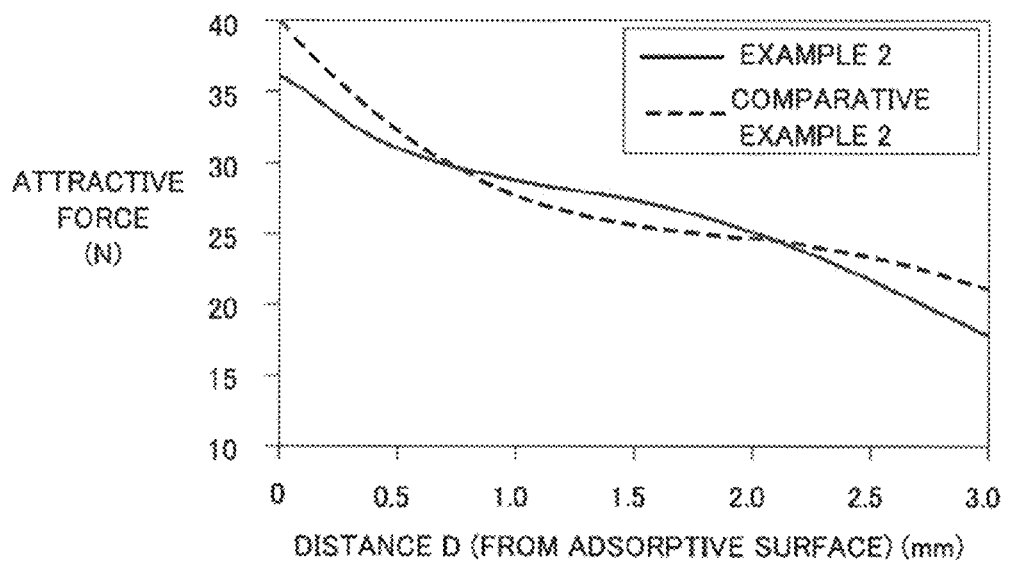
FIG. 13 A graph showing attractive force curves of Example 2 and Comparative Example 2 in a second example of the present invention.

Then, using the proportional solenoid 100 and 300 of Example 2 and Comparative Example 2, attractive force measurement was performed in the same manner as in the first example described above. The measurement results are shown in TABLE 3 and FIG. 13.

TABLE 3

| DISTANCE D (mm) | ATTRACTIVE FORCE (N) OF EXAMPLE 2 | ATTRACTIVE FORCE (N) OF COMPARATIVE EXAMPLE 2 | RELATIVE RATIO (%) |
|---|---|---|---|
| 0.0 (ADSORPTIVE SURFACE) | 36.3 | 40.3 | 9.9 |
| 0.5 | 30.7 | 31.6 | 3.0 |
| 1.0 | 28.4 | 27.6 | 2.9 |
| 1.5 | 26.8 | 25.4 | 5.5 |
| 2.0 | 24.6 | 24.1 | 2.1 |
| 2.5 | 21.4 | 22.9 | 6.8 |
| 3.0 | 17.5 | 20.7 | 15.5 |

As shown in TABLE 3, the results of the attractive force measurement were obtained that when a distance D from the adsorptive surface 11b was 2.5 mm or less, the relative ratio (=|attractive force of Example 2−attractive force of Comparative Example 2|/attractive force of Comparative Example 2×100) (%) of the attractive force of the proportional solenoid 100 of Example 2 to the attractive force of the proportional solenoid 300 of Comparative Example 2 was 10% or less. Thus, it has been confirmable that the proportional solenoid 100 of Example 2 can obtain the same performance as the proportional solenoid 300 of Comparative Example 2. Consequently, it has been confirmable that a proportional solenoid having a similar attractive force curve (solenoid characteristics) as that of Comparative Example 2 with a taper angle θ of 30 degrees can be produced by heat treatment. In addition, the tubular fixed iron core 1 used for a solenoid of Example 2 is not braze-joined, and thus unlike the fixed iron core 301 of Comparative Example 2, the tubular fixed iron core 1 of Example 2 can conceivably withstand high pressure even when used for applications in which high pressure is applied.

Differences between the method for manufacturing the proportional solenoid of Example 1 and the method for manufacturing the proportional solenoid of Example 2 are the heating position H and the holding time. From FIGS. 8 and 13, it has been confirmable that the fixed iron core 1 of Example 2 having an attractive force curve different from that of the fixed iron core 1 of Example 1 can be produced by making these different.

Third Example

A third example is now described. In the third example, a proportional solenoid 100 including a fixed iron core 1 of each of Example 3a and Example 3b in which a holding time or a holding temperature gradient was different from that of the tubular fixed iron core 1 used for a solenoid of the second example described above was produced, and the attractive force curve thereof was measured.

(Proportional Solenoids of Example 3a and Example 3b)

The proportional solenoid 100 including the fixed iron core 1 of Example 3a was produced in the same manner as the tubular fixed iron core 1 used for a solenoid of Example 2 described above except that the holding time was set to 9 seconds. Furthermore, the proportional solenoid 100 including the fixed iron core 1 of Example 3b was produced in the same manner as the tubular fixed core 1 used for the solenoid of Example 2 described above except that a holding temperature rate indicating the holding temperature gradient was set to −10° C./second.

(Proportional Solenoids of Comparative Example 3a and Comparative Example 3b)

A proportional solenoid 300 (see FIG. 7) including a tubular fixed iron core 301 used for a solenoid of Comparative Example 3a was produced in the same manner as in Comparative Example 2 described above except that a magnetic portion 312 and a nonmagnetic portion 313 were braze-joined such that the taper angle θ was 45 degrees. Furthermore, a proportional solenoid 300 including a fixed iron core 301 of Comparative Example 3b was produced in the same manner as in Comparative Example 2 described above except that a magnetic portion 312 and a nonmagnetic portion 313 were braze-joined such that the taper angle θ was 60 degrees.

(Attractive Force Measurement)

Then, using the proportional solenoids 100 and 300 of Example 3a and Example 3b and Comparative Example 3a and Comparative Example 3b, attractive force measurement was performed in the same manner as in the second example described above. Furthermore, an attractive force (reference attractive force) at a reference position at which a distance D from an adsorptive surface 11b was 1 mm was obtained. Then, a region in which a relative ratio (=|attractive force at distance D−reference attractive force|/reference attractive force×100) to the reference attractive force (%) was 10% or less was defined as a flat region, and the length of the flat region was obtained. The measurement results are shown in TABLE 4 and FIGS. 14 and 15.

the holding temperature gradient in the high-frequency heating applied to the tubular fixed iron core 1.

Fourth Example

A fourth example is now described. In the fourth example, a proportional solenoid 100 including a fixed iron core 1 of each of Example 4a, Example 4b, Example 5a to Example 5d, Example 6a to Example 6d, and Example 7a to Example 7c in which parameters (a heating position H, a heating rate, a heating temperature, a holding time, and a holding tem-

TABLE 4

| | HEATING CODNITIONS | | HOLDING CODNITIONS | | DISTANCE D | | |
|---|---|---|---|---|---|---|---|
| | HEATING RATE (° C/s) | HEATING TEMPERATURE (° C/s) | HOLDING TEMPERATURE GRADIENT (° C/s) | HOLDING TIME (s) | (mm) FROM ADSORPTIVE SURFACE | REFERENCE ATTRACTIVE FORCE (N) | FLAT REGION (mm) |
| EXAMPLE 2 | 190 | 1250 | 0 0 | 15 | 6.5 | 28.4 | 1.2 |
| EXAMPLE 3a | | | 0.0 | 9 | | 26.1 | 2.0 |
| EXAMPLE 3b | | | ~10 | 15 | | 21.8 | 3.0 |

Figure 14:
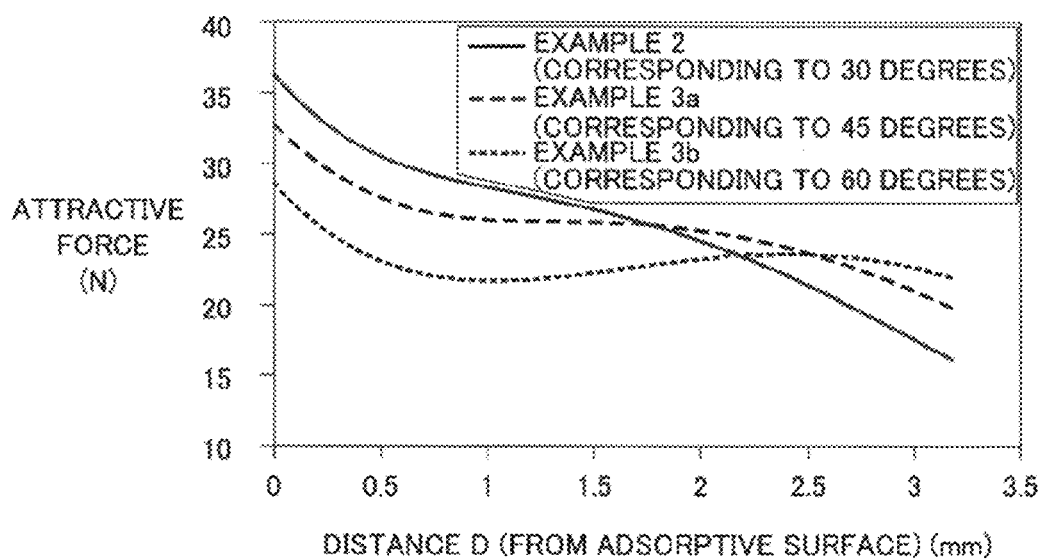
FIG. 14 A graph showing attractive force curves of Example 2, Example 3a, and Example 3b in a third example of the present invention.

As shown in TABLE 4 and FIG. 14, the results of the attractive force measurement were obtained that in the proportional solenoids 100 of Example 2, Example 3a, and Example 3b, attractive force curves having flat regions, the lengths of which were different from each other, were obtained. Consequently, it has been confirmable that the proportional solenoids 100 having the different attractive force curves can be produced by making the holding time or the holding temperature gradient different in high-frequency heating applied to the tubular fixed iron core 1.

From the results of Example 2 and Example 3a, it has been confirmable that the flat region becomes longer when the holding time is decreased. Furthermore, from the results of Example 2 and Example 3b, it has been confirmable that the flat region becomes longer when the holding temperature gradient is decreased. These are conceivably because the amount of heat conducted from a nonmagnetic region forming portion R1 to another portion was decreased, and thus a semimagnetic region 14 (unstable structure) was not formed so much.

Figure 15:
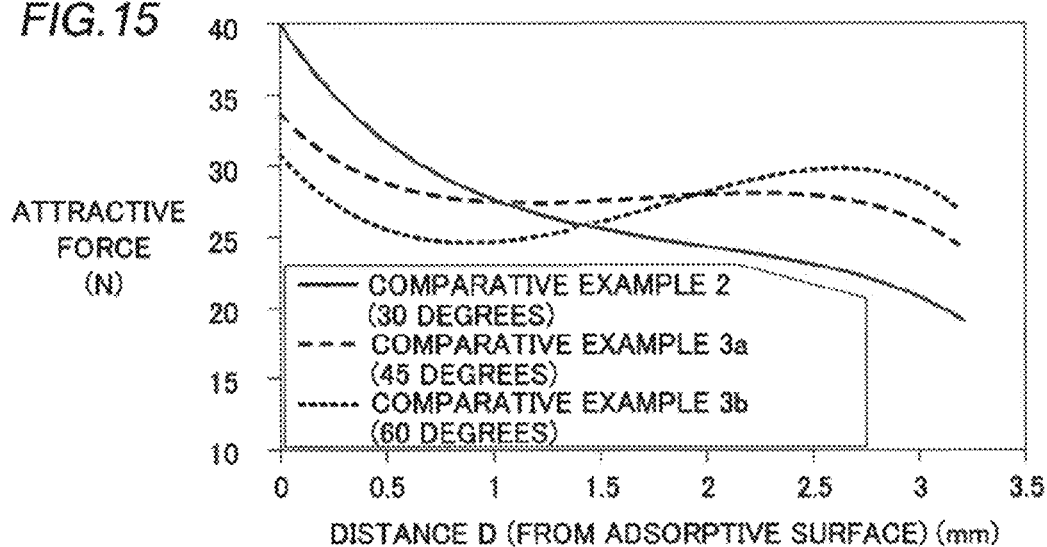
FIG. 15 A graph showing attractive force curves of Comparative Example 2, Comparative Example 3a, and Comparative Example 3b in the third example of the present invention.

As shown in FIGS. 14 and 15, in the proportional solenoids 100 of Example 2, Example 3a, and Example 3b, similar attractive force curves to those of Comparative Example 2, Comparative Example 3a, and Comparative Example 3b were obtained, respectively. Consequently, it has been confirmable that a desired attractive force curve can be appropriately created by changing the holding time or perature gradient) were different from those of the tubular fixed iron core 1 used for a solenoid of the second example described above was produced, and the attractive force curve thereof was measured.

(Proportional Solenoids of Example 4a to Example 7c)

As Example 4a and Example 4b, the proportional solenoids 100 including the fixed iron cores 1 with different heating rates were produced, as Example 5a to Example 5d, the proportional solenoids 100 including the fixed iron cores 1 with different holding times were produced, as Example 6a to Example 6d, the proportional solenoids 100 including fixed iron cores 1 with different holding temperature gradients were produced, and as Example 7a to Example 7c, the proportional solenoids 100 including fixed iron cores 1 with different heating positions H were produced. Specifically, as shown in TABLE 5, by the manufacturing method of the aforementioned embodiment, the respective proportional solenoids 100 were produced in the same manner as the tubular fixed iron core 1 used for a solenoid of Example 2 except for the conditions (underlined portions in the table) different from those of Example 2. In the production of the fixed iron cores 1 of Example 4a to Example 7c, the heating temperature was made different from that in the production of the fixed iron cores 1 of Example 2, Example 3a, and Example 3b. Then, attractive force measurement was performed in the same manner as in Example 3a and Example 3b. The measurement results are shown in FIGS. 16 to 19.

TABLE 5

| | HEATING CONDITIONS | | HOLDING CONDITIONS | | HEATING POSITION DISTANCE t (mm) FROM ADSORPTIVE SURFACE |
|---|---|---|---|---|---|
| | HEATING RATE (° C./s) | HEATING TEMPERATURE (° C.) | HOLDING TIME (s) | HOLDING TEMPERATURE GRADIENT (° C./s) | |
| EXAMPLE 4a | <u>120</u> | 1200 | 10 | 0 | 2.5 |
| EXAMPLE 4b | <u>180</u> | 1200 | 10 | 0 | 2.5 |
| EXAMPLE 5a | 190 | 1200 | <u>5</u> | 0 | 2.5 |

TABLE 5-continued

| | HEATING CONDITIONS | | HOLDING CONDITIONS | | HEATING POSITION DISTANCE |
|---|---|---|---|---|---|
| | HEATING RATE (° C./s) | HEATING TEMPERATURE (° C.) | HOLDING TIME (s) | HOLDING TEMPERATURE GRADIENT (° C./s) | t (mm) FROM ADSORPTIVE SURFACE |
| EXAMPLE 5b | 190 | 1200 | 10 | 0 | 2.5 |
| EXAMPLE 5c | 190 | 1200 | 15 | 0 | 2.5 |
| EXAMPLE 5d | 190 | 1200 | 20 | 0 | 2.5 |
| EXAMPLE 6a | 190 | 1200 | 10 | 0 | 2.5 |
| EXAMPLE 6b | 190 | 1200 | 10 | −5 | 2.5 |
| EXAMPLE 6c | 190 | 1200 | 10 | −10 | 2.5 |
| EXAMPLE 6d | 190 | 1200 | 10 | −15 | 2.5 |
| EXAMPLE 7a | 190 | 1200 | 10 | 0 | 1.5 |
| EXAMPLE 7b | 190 | 1200 | 10 | 0 | 2.5 |
| EXAMPLE 7c | 190 | 1200 | 10 | 0 | 3.5 |

As shown in FIGS. 16 to 19, it has been confirmable that the proportional solenoids 100 having different attractive force curves can be produced by varying the respective parameters (the heating rate, the holding time, the holding temperature gradient, and the heating position H) to various values.

Figure 16:
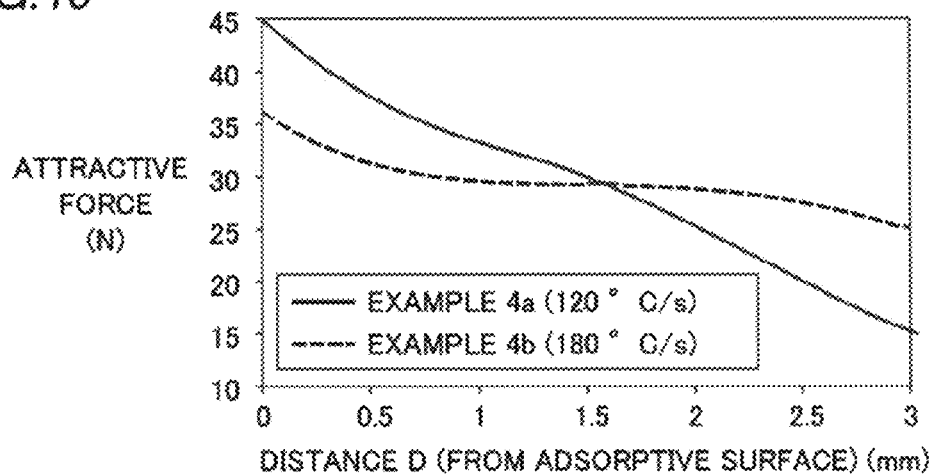
FIG. 16 A graph showing attractive force curves of Example 4a and Example 4b in a fourth example of the present invention.
Figure 17:
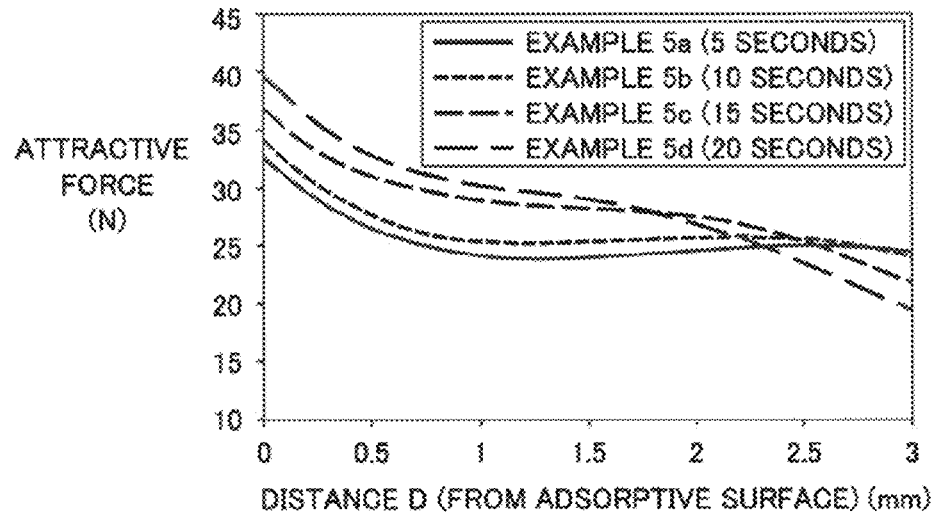
FIG. 17 A graph showing attractive force curves of Example 5a, Example 5b, Example 5c, and Example 5d in the fourth example of the present invention.
Figure 18:
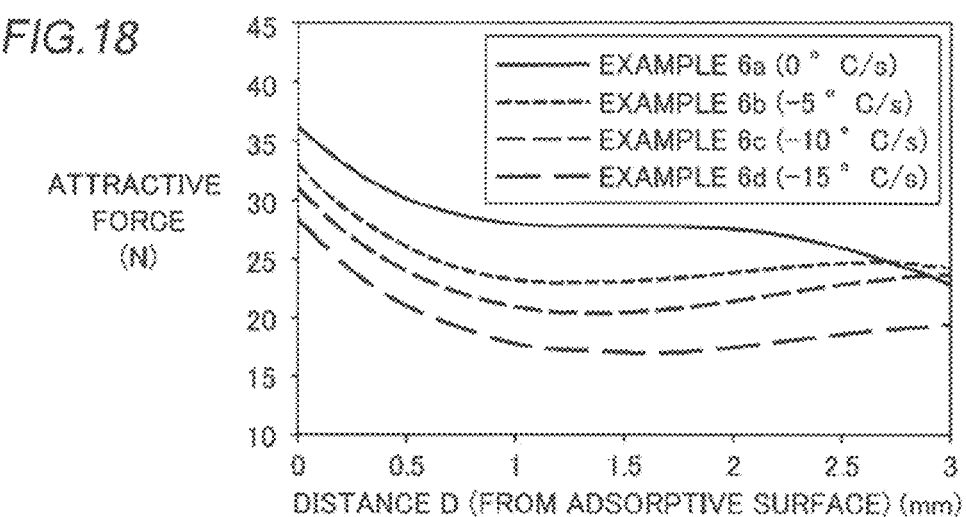
FIG. 18 A graph showing attractive force curves of Example 6a, Example 6b, Example 6c, and Example 6d in the fourth example of the present invention.
Figure 19:
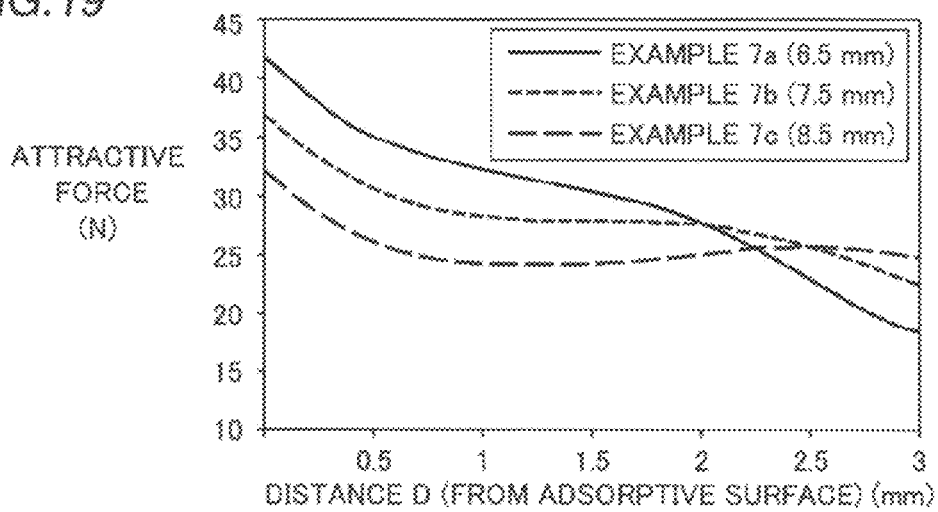
FIG. 19 A graph showing attractive force curves of Example 7a, Example 7b, and Example 7c in the fourth example of the present invention.

As shown in FIG. 16, it has been confirmable that in Example 4b in which the heating rate is higher, a flat region becomes longer and the corresponding taper angle θ tends to become larger than those in Example 4a in which the heating rate is lower. As shown in FIG. 17, it has been confirmable that in Example (Example 5a, for example) in which the holding time is shorter, a flat region becomes longer and the corresponding taper angle θ tends to become larger than those in Example (Example 5d, for example) in which the holding time is longer. As shown in FIG. 18, it has been confirmable that in Example (Example 6d, for example) in which the holding temperature gradient is smaller, a flat region becomes longer and the corresponding taper angle θ tends to become larger than those in Example (Example 6a, for example) in which the holding temperature gradient is larger. As shown in FIG. 19, it has been confirmable that in Example (Example 7c, for example) in which the heating position H is farther from an adsorptive surface, a flat region becomes longer and the corresponding taper angle θ tends to become larger than those in Example (Example 7a, for example) in which the heating position H is closer to the adsorptive surface.

Furthermore, from Example 1 (a heating rate of 190° C./s and a heating temperature of 1250° C.) shown in FIG. 8 and Example 5a (a heating rate of 120° C./s and a heating temperature of 1250° C.) shown in FIG. 19, for example, it has been confirmable that the proportional solenoids 100 having different attractive force curves are also produced by changing two or more of the parameters (the heating temperature, the heating rate, the holding time, the holding temperature gradient, and the heating position H).

Fifth Example

A fifth example is now described. In the fifth example, tubular fixed iron cores 1 used for a solenoid of Example 8a, Example 8b, and Example 8c having similar attractive force curves to those of Example 2, Example 3a, and Example 3b with corresponding taper angles 6 of 30 degrees, 45 degrees and 60 degrees were produced, and the magnetization, the pressure resistance, and the Vickers hardness were measured. In addition, structure observation was performed by an FE-SEM, and comparison of the amount of carbides was performed from the observation results. Furthermore, observation of θx, cross-sectional observation of a nonmagnetic region using corrosion treatment, and cross-sectional observation of a semimagnetic region using the corrosion treatment were performed.

(Fixed Iron Cores of Example 8a, Example 8b, and Example 8c)

As Example 8a, a tubular fixed iron core 1 used for a solenoid having a corresponding taper angle θ of 30 degrees was produced in the same manner as in Example 2 described above. As Example 8b and Example 8c, fixed iron cores 1 having corresponding taper angles 9 of 45 degrees and 60 degrees were produced in the same manner as in Example 3a and Example 3b described above, respectively. The thicknesses (=(outer diameter−inner diameter)/2) of the fixed iron cores 1 of Example 8a to Example 8c were 2.4 mm.

(Magnetization Measurement)

Figure 20:
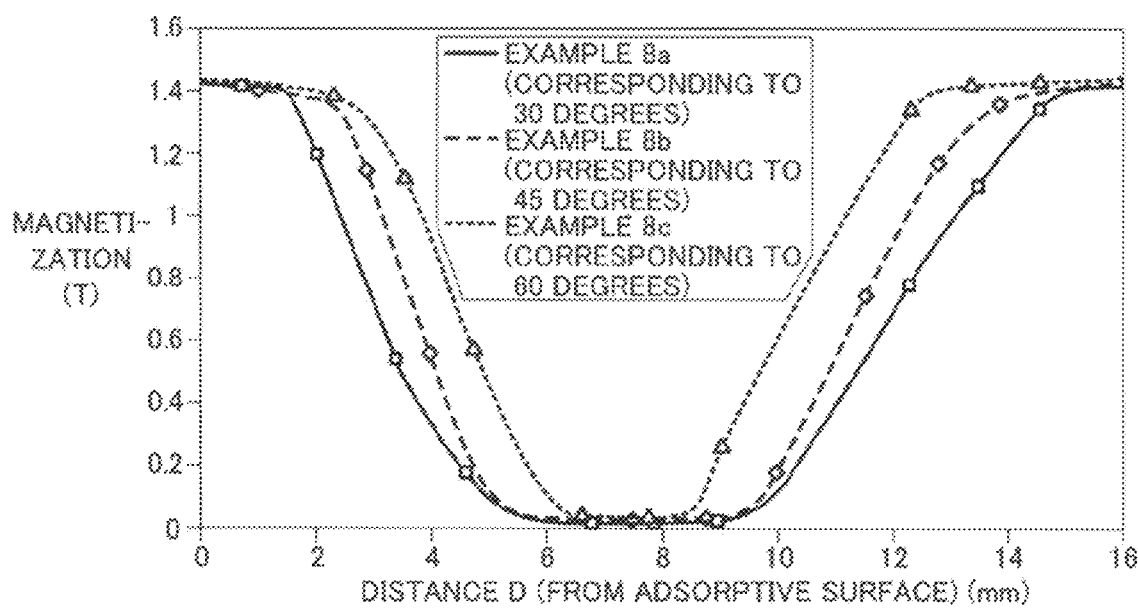
FIG. 20 A graph showing changes in magnetization with distance from an adsorptive surface of Example 8a, Example 8b, and Example 8c in the fifth example of the present invention.

Then, using the fixed iron cores 1 of Example 8a to Example 8c, magnetization measurement was performed in the same manner as in the first example described above. The measurement results are shown in FIG. 20.

As the results of the magnetization measurement, it has been confirmed that the fixed iron cores 1 having different magnetization can be obtained by making at least one of the heat treatment conditions, i.e. the holding time and the holding temperature gradient, different. Due to this difference in magnetization, in the proportional solenoids 100 using the fixed iron cores 1 of Example 8a to Example 8c, different attractive force curves can be obtained.

(Pressure Resistance Measurement)

(Fixed Iron Cores of Reference Example and Comparative Example 4)

In pressure resistance measurement, first, a fixed iron core of Comparative Example 4 was produced as a comparative example of Example 8a to Example 5c. The fixed iron core of Comparative Example 4 includes a magnetic portion made of a composite magnetic material made of a rod-shaped Fe—Cr—Ni—Mn—Al—C alloy and a nonmagnetic portion made of SUS304 such that a taper angle θ defined by a tapered joint surface and the inner surface of the fixed iron core is 45 degrees, similarly to the fixed iron core 301 (see FIG. 7) of Comparative Example 1. As a specific method for manufacturing the fixed iron core of Comparative Example 4, a nonmagnetic material was braze-joined to a tapered surface of the magnetic portion made of a ferromagnetic material such that the tapered surface of the magnetic portion and a tapered surface of the nonmagnetic portion were joined to each other to produce the fixed iron core of Comparative Example 4. Furthermore, as a reference example of Example 8a to Example 5c, a fixed iron core was prepared in the same manner as the method for manufacturing the fixed iron cores of Example 8a to Example 8c except that high-frequency heat treatment was not performed.

In order to measure the pressure resistance of the fixed iron cores of Example 8a to Example 8c, the reference example, and Comparative Example 4, a static characteristic breaking test was performed. In the static characteristic breaking test, one end of each of the fixed iron cores was closed, and the other end was connected to a fixed iron core connected to a pressure pump (UP-21, manufactured by RIKEN POWER). Then, the pressure pump was driven such that a pressure in each of the fixed iron cores was increased. The maximum pressure capable of being applied by the pressure pump was 150 MPa. A pressure at the time of breaking a fixed iron core was defined as a bursting pressure. Moreover, the presence or absence of bulge (deformation) and breakage was visually observed. TABLE 6 shows the measurement results.

TABLE 6

| | BURSTING PRESSURE | PRESENCE OR ABSENCE OF BULGE AND BREAKAGE |
|---|---|---|
| EXAMPLE 8a | min 150 MPa | ABSENCE |
| EXAMPLE 8b | min 150 MPa | ABSENCE |
| EXAMPLE 8c | min 150 MPa | ABSENCE |
| REFERENCE EXAMPLE | min 150 MPa | ABSENCE |
| COMPARATIVE EXAMPLE 4 | 30 MPa | PRESENCE |

As the results of the pressure resistance measurement, in any of Example 8a to Example 8c, even when the maximum pressure (150 MPa) capable of being applied by the pressure pump was applied, the fixed iron core did not break, and bulge and breakage could not been observed as in the reference example. That is, it has been found that Example 8a to Example 8c has a bursting pressure (min 150 MPa) that is greater than at least 150 MPa. On the other hand, in Comparative Example 4, bulge and breakage from a brazed joint portion occurred at a pressure (bursting pressure) of 30 MPa. Thus, it has been confirmable that the fixed iron core 1 of the present embodiment can be sufficiently used even under high pressure without decreasing its pressure resistance before and after the heat treatment. Furthermore, a cycle test (acceleration test) in which a high pressure of 40 MPa was repeatedly applied one million times and a cycle test in which a high pressure of 45 MPa was repeatedly applied one million times were performed. The fixed iron core 1 of the present embodiment showed sufficient durability without bulging (deforming) and breaking.

(Vickers Hardness Measurement)

The Vickers hardness of each of the tubular fixed iron cores 1 used for the proportional solenoids 100 of Example 8a, Example 8b, and Example 8c having corresponding taper angles 9 of 30, 45, and 60 degrees was measured.

Specifically, a test piece (see FIG. 9(b)) of 17.0 mm (Z-axis direction)×5.0 mm (A direction)×2.0 mm (thickness direction) was cut out from each of the fixed iron cores 1 of Example 8a, Example 8b, and Example 8c in the same manner as in the first example. Then, the outer surface (a surface in which hatching is formed in FIG. 9(b)) side of the fixed iron core 1 of the cut-out test piece was mirror-finished for Vickers hardness measurement.

Then, the Vickers hardness of Example 8a, Example 8b, and Example 8c was measured in the same manner as in Example 1. The measurement results are shown in FIG. 21.

Figure 21:
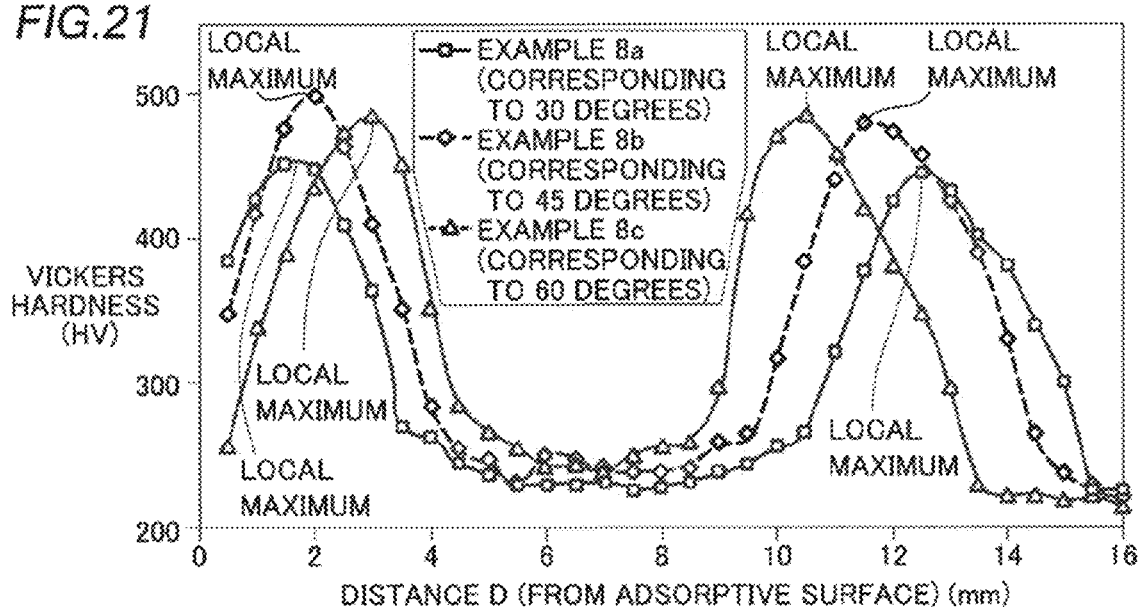
FIG. 21 A graph showing changes in Vickers hardness with distance from the adsorptive surface of Example 8a, Example 8b, and Example 8c in the fifth example of the present invention.

When the results of the Vickers hardness measurement shown in FIG. 21 were taken in conjunction with the results of the magnetization measurement in FIG. 20, in the vicinity of the center (distance D from the adsorptive surface 11b=6.5 mm) of the heating position H, the magnetization was sufficiently decreased to 0.01 T or less, and the Vickers hardness (HV) was decreased to about 250 or less. Thus, it has been confirmable that the nonmagnetic region 13 mainly includes the austenite structure, which is nonmagnetic and has a relatively small Vickers hardness.

On the other hand, as a distance from the center of the heating position H increased, the magnetization increased, and the Vickers hardness (HV) increased to about 450 to 500 or more. Thus, it has been confirmable that on the nonmagnetic region 13 side of the semimagnetic region 14, the abundance ratio of the austenite structure decreases from the nonmagnetic region 13 toward the magnetic region 12, and the abundance ratio of the martensite structure, which is ferromagnetic and has a large Vickers hardness, increases from the nonmagnetic region 13 toward the magnetic region 12.

As the distance from the center of the heating position H further increased, the magnetization increased slightly, and the Vickers hardness (HV) decreased to about 220. Thus, it has been confirmable that on the magnetic region 12 side of the semimagnetic region 14, the abundance ratio of the martensite structure decreases from the nonmagnetic region 13 toward the magnetic region 12, and the abundance ratio of the ferrite structure, which is ferromagnetic and has a relatively small Vickers hardness, increases from the nonmagnetic region 13 toward the magnetic region 12.

Consequently, it has been confirmable that the semimagnetic region 14 has such a magnetic gradient that the magnetization increases from the nonmagnetic region 13 toward the magnetic region 12, and in the semimagnetic region 14, such a hardness gradient that the hardness (Vickers hardness) increases and then decreases is obtained, i.e. the semimagnetic region 14 has the local maximum of the Vickers hardness, and the semimagnetic region 14 has the local maximum of the abundance ratio of the martensite structure.

(Metal Structure Observation)

Next, the positions of the magnetic region 12, the semimagnetic region 14, and the nonmagnetic region 13 of each of Example 8a, Example 8b, and Example 8c were estimated from the Vickers hardness measurement described above, and the metal structure was observed for each of the portions. Specifically, a board of 17.0 mm (Z-axis direction)× 5.0 mm (A direction)×2.0 mm (thickness direction) was cut out from each of the fixed iron cores 1 of Example 8a, Example 8b, and Example 8c in the same manner as in the Vickers hardness measurement, and was subjected to picric acid corrosion treatment. Observation was performed using an FE-SEM (JSM-7001F, manufactured by JEOL Ltd.) and an EDX (JED-2300 SD10, manufactured by JEOL Ltd.) at an acceleration voltage of 15 kV and a working distance (W.D.) of 10 mm. Each FE-SEM image is shown in FIG. 22.

Figure 22:
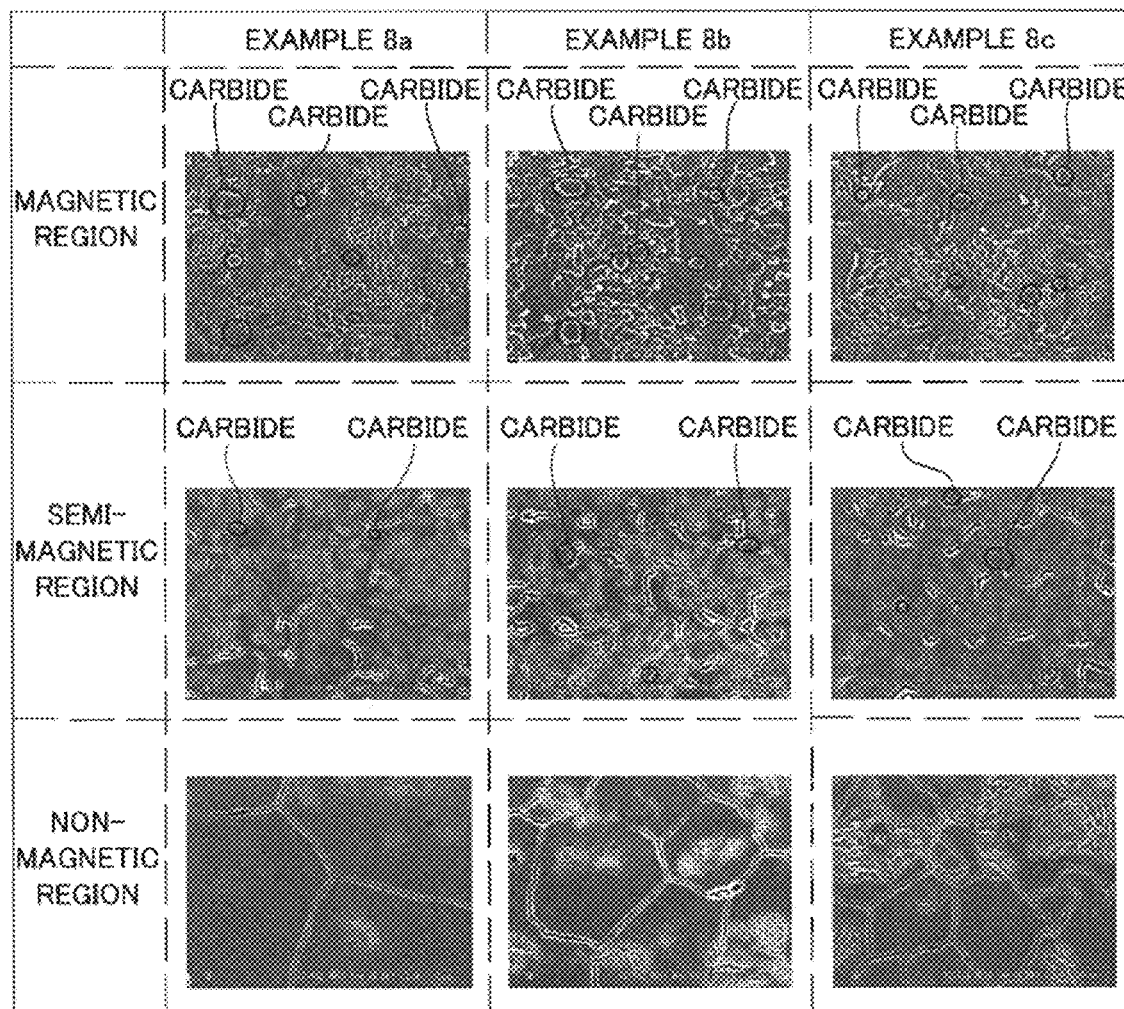
FIG. 22 Photographs showing FE-SEM images of the regions of Example 8a, Example 8b, and Example 8c in the fifth example of the present invention.

FIG. 22 shows that the nonmagnetic region 13 has the characteristics of the austenite structure having a relatively large crystal grain size and a clear grain boundary. No carbide precipitation was observed in the nonmagnetic region 13, but carbide precipitation was observed in the semimagnetic region 14 and the magnetic region 12. The carbides were confirmed by a backscattered electron detection mode of the FE-SEM, and the composition of the carbides was also confirmed by the EDX. In the magnetic region 12, more carbide was confirmed than in the semimagnetic region 14.

(Carbide Amount Observation)

Next, in the FE-SEM observation under each treatment condition, the ratio of a carbide amount area to the total observation area was confirmed. The ratio (%) of the amount of carbides is shown in TABLE 7 and FIG. 23.

TABLE 7

| | AMOUNT OF CARBIDES (%) | | |
| --- | --- | --- | --- |
| DISTANCE D (mm) | EXAMPLE 8a (CORRESPONDING TO 30 DEGREES) | EXAMPLE 8b (CORRESPONDING TO 45 DEGREES) | EXAMPLE 8c (CORRESPONDS TO 60 DEGREES) |
| 1 | 4.80 | 5.37 | 5.65 |
| 2 | 3.80 | 4.26 | 4.77 |
| 3 | 1.68 | 2.34 | 3.18 |
| 4 | 1.20 | 1.33 | 1.44 |
| 5 | 0.00 | 0.00 | 0.00 |

Figure 23:
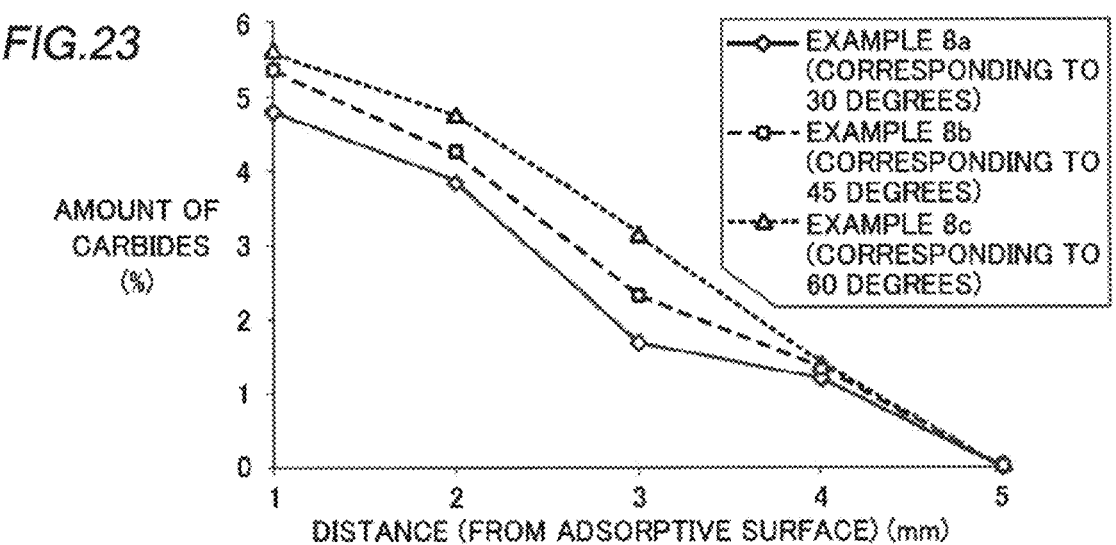
FIG. 23 A graph showing changes in the amount of carbides with distance from the adsorptive surface of Example 8a, Example 8b, and Example 8c in the fifth example of the present invention.

From the observation results shown in TABLE 7 and FIG. 23, it has been confirmed that in all of Example 8a to Example 5c, the amount of carbides gradually decreases from the magnetic region 12 toward the nonmagnetic region 13, and no carbide is detected in the nonmagnetic region 13. Furthermore, in Example 8a corresponding to a taper angle θ of 30 degrees and having the longer flat region, a decrease in the amount of carbides was observed at a stage at which the distance D from the adsorptive surface 11b was smaller (D=3 mm, for example) as compared with Example 8c corresponding to a taper angle θ of 60 degrees and having the shorter flat region. In the magnetic region 12, carbon is not dissolved in the ferrite structure, and thus a large amount of carbon is detected as carbides. In the semimagnetic region 14, a portion of carbon is dissolved in the martensite structure, and only the carbon not dissolved in the martensite structure is detected as carbides. Thus, in the semimagnetic region 14, the amount of detected carbides further decreases as compared with the magnetic region 12. In the nonmagnetic region 13, carbon is dissolved in the austenite structure, and thus no carbide is detected.

(Observation of Angle θx)

Figure 24:
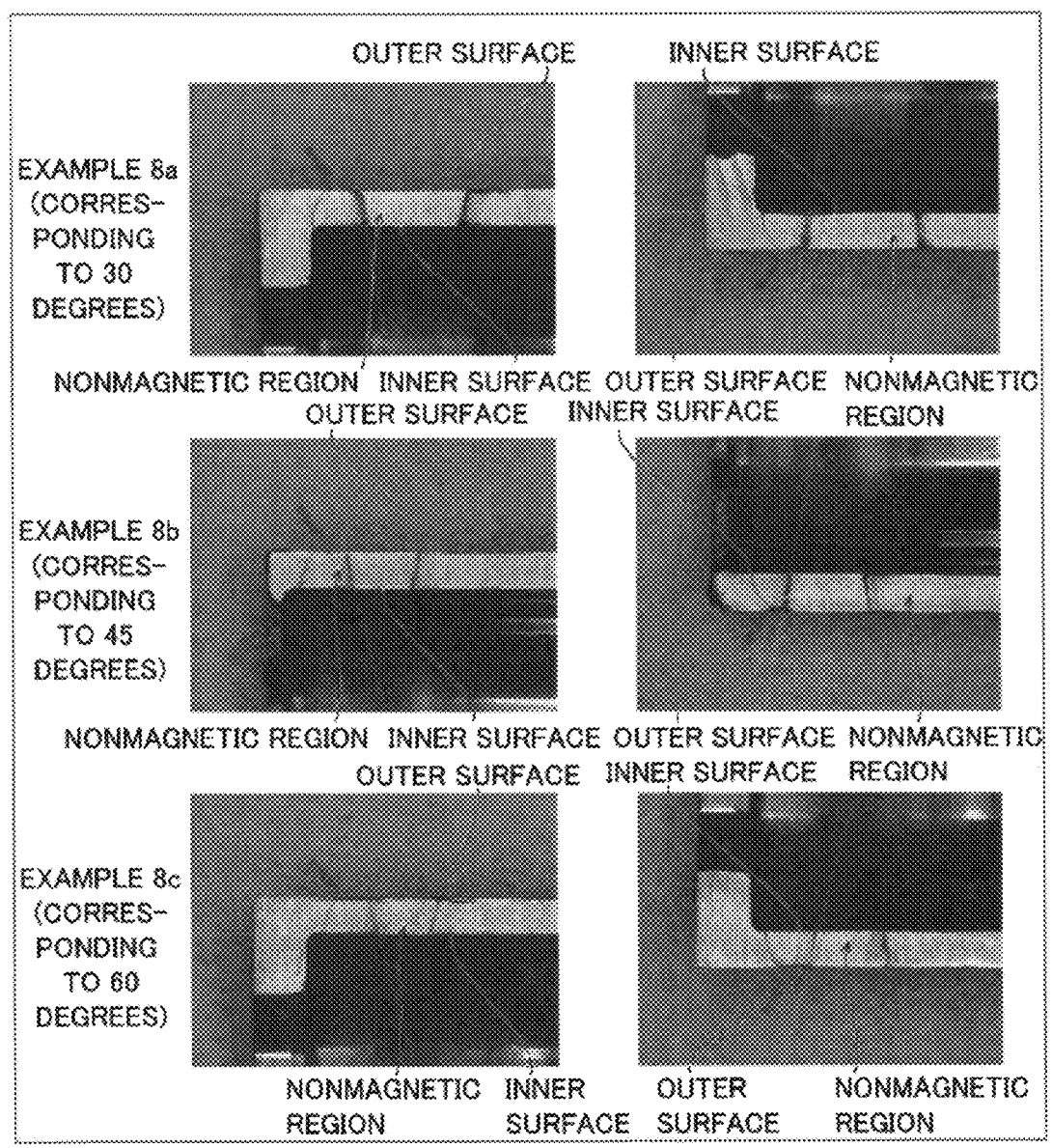
FIG. 24 Photographs showing a state in which toner is adsorbed around the semimagnetic region of the cross-section of the fixed iron core of Example 8a, Example 8b, and Example 8c in the fifth example of the present invention.

Next, the angle θx (see FIG. 4) defined by the boundary 14a between the nonmagnetic region 13 and the semimagnetic region 14 and the inner surface 11c of the fixed iron core 1 was observed. Specifically, first, each of the fixed iron cores 1 of Example 8a to Example 5c was cut in the axial direction for observation. Then, in the vicinity (see FIG. 4) of the heat treatment region R on the cut surface, a magnet was attached to the adsorptive surface 11b side, a small amount of toner as magnetic powder was placed near the center of the nonmagnetic region 13 and was gradually spread to both sides, using a cotton swab to apply vibration, a boundary at which the toner was adsorbed, i.e. the boundary 14a between the nonmagnetic region 13 and the semimagnetic region 14 was visualized, and the angle θx was observed. The cylindrical fixed iron core 1 was cut such that the angle θx was measured at each of two boundaries 14a (a measurement point 1 and a measurement point 2). The results are shown in TABLE 8 and FIG. 24.

TABLE 8

| | CORRESPONDING TAPER ANGLE θ | MEASUREMENT POINT 1 | MEASUREMENT POINT 2 |
| --- | --- | --- | --- |
| EXAMPLE 8a | CORRESPONDING TO 30 DEGREES | 79.8 DEGREES | 80.9 DEGREES |
| EXAMPLE 8b | CORRESPONDING TO 45 DEGREES | 78.3 DEGREES | 79.9 DEGREES |
| EXAMPLE 8c | CORRESPONDING TO 60 DEGREES | 74.0 DEGREES | 75.0 DEGREES |

As the measurement results, it has been found that the angle θx in each of Example 8a to Example 8c has no correlation with the taper angle θ of the corresponding comparative example, and is about 70 degrees to 85 degrees.

(Observation of Nonmagnetic and Semimagnetic Regions)

Next, formation of the nonmagnetic region 13 and the semimagnetic region 14 was observed using the corrosion treatment. A difference in the metal structure can be observed as a difference in color contrast using the corrosion treatment. Specifically, the fixed iron core 1 of Example 8b cut in the Z-axis direction was heat-treated at 650° C. for one hour, and then was subjected to the picric acid corrosion treatment. Then, the fixed iron core 1 of Example 8b after the picric acid corrosion treatment was observed. The observation results are shown in FIG. 25.

Figure 25:
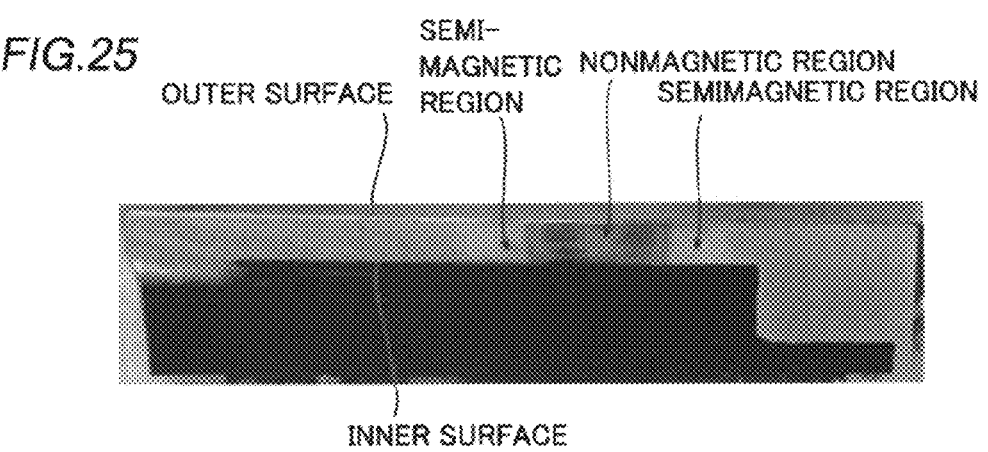
FIG. 25 A photograph in which formation of the semi-magnetic region and the nonmagnetic region has been confirmed by corrosion-treating the cross-section of the fixed iron core of Example 8b in the fifth example of the present invention.

As shown in FIG. 25, it has been confirmable that the nonmagnetic region 13 and the semimagnetic region 14 are formed continuously and integrally in the fixed iron core 1 of Example 8b.

Modified Examples

The embodiment and Examples disclosed this time must be considered as illustrative in all points and not restrictive. The scope of the present invention is not shown by the above description of the embodiment and Examples but by the scope of claims for patent, and all modifications (modified examples) within the meaning and range equivalent to the scope of claims for patent are further included.

For example, while the example in which the semimagnetic region 14 is formed at the position spaced apart from the adsorptive surface 11b in the Z-axis direction has been shown in the aforementioned embodiment, the present invention is not restricted to this. In the present invention, the semimagnetic region and the adsorptive surface may be overlaid on each other in the Z-axis direction.

While the example in which the heated tubular member 101 is rapidly cooled by water cooling has been shown in the aforementioned embodiment, the present invention is not restricted to this. In the present invention, the heated tubular member may be cooled by oil cooling, for example.

While the nonmagnetic region forming portion R1 is rapidly heated to a heating temperature of 1000° C. or higher and 1300° C. or lower, and the heated state of the nonmagnetic region forming portion R1 is held for the holding time such that the holding temperature gradient of the nonmagnetic region forming portion R1 falls within a holding temperature gradient range of −20° C./second or more and 5° C./second or less has been shown in the aforementioned embodiment, the present invention is not restricted to this. In the present invention, the heating position including the nonmagnetic region forming portion may be rapidly heated to a heating temperature of 1000° C. or higher and 1300° C. or lower, and the heated state of the heating position may be held for the holding time such that the holding temperature gradient at the heating position falls within a holding temperature gradient range of −20° C./second or more and 5° C./second or less. That is, the heating position and the nonmagnetic region forming portion may be regarded as the same region.

While the example in which the nonmagnetic region forming portion R1 is rapidly heated while the tubular member 101 is rotated at a predetermined rotation speed has been shown in the aforementioned embodiment, the present invention is not restricted to this. In the present invention, the nonmagnetic region forming portion may be rapidly heated without rotating the tubular member.

Furthermore, the attractive force curve can be changed by changing the dimensions of the movable iron core 21 or changing the dimensions of the tubular member by shaving. That is, various changes in the distribution of the magnetic characteristics of the tubular member and the solenoid characteristics of the proportional solenoid can be made by changing the dimensions in addition to the manufacturing method described above.

Furthermore, the high-frequency induction heater of the present embodiment may have not only a function of controlling the amount of alternating current flowing through the high-frequency coil but also a function of controlling (making) the frequency of the alternating current (variable). The formation states of the semimagnetic region and the nonmagnetic region by high-frequency heating can also be changed by changing the frequency of the alternating current, and the solenoid characteristics of the proportional solenoid can conceivably be controlled.

DESCRIPTION OF REFERENCE NUMERALS

1: fixed iron core (tubular member)
2: rod assembly (movable magnetic body)
11b: adsorptive surface
12: magnetic region
12a: magnetic region (first magnetic region)
12b: magnetic region (second magnetic region)
13: nonmagnetic region
14: semimagnetic region
14a: semimagnetic region (first semimagnetic region)
14b: semimagnetic region (second semimagnetic region)
100: proportional solenoid
101: tubular member
Z: axial direction

The invention claimed is:

1. A proportional solenoid (100) including a fixed iron core (1) including a tubular member (101) made of a composite magnetic material and a movable magnetic body (2) inserted into the tubular member, the movable magnetic body being movable in an axial direction of the tubular member; wherein
the tubular member includes an adsorptive surface (11b) provided substantially parallel to a surface orthogonal to the axial direction, the adsorptive surface facing the movable magnetic body; and
a first magnetic region (12a) including the adsorptive surface, the first magnetic region mainly including a ferrite structure, a first semimagnetic region (14c) present at a position spaced apart from the adsorptive surface, the first semimagnetic region including a ferrite structure, a martensite structure, and an austenite structure, and a nonmagnetic region (13) present at a position spaced farther apart from the adsorptive surface than the first semimagnetic region, the nonmagnetic region mainly including an austenite structure, are formed continuously and integrally along the axial direction of the tubular member.

2. The proportional solenoid according to claim 1, wherein
a Vickers hardness (HV) of the tubular member varies in a range of 200≤HV≤600; and
the Vickers hardness (HV) in the first magnetic region and the nonmagnetic region is 200≤HV≤300, and the first semimagnetic region has a local maximum of the Vickers hardness (HV) in a range of 400≤HV≤600.

3. The proportional solenoid according to claim 2, wherein the first semimagnetic region has a local maximum of an abundance ratio of the martensite structure.

4. The proportional solenoid according to claim 1, wherein an amount of carbides present in the first semimagnetic region is larger than an amount of carbides present in the nonmagnetic region and smaller than an amount of carbides present in the first magnetic region.

5. The proportional solenoid according to claim 4, wherein the amount of carbides present in the first semimagnetic region gradually decreases from the first magnetic region toward the nonmagnetic region.

6. The proportional solenoid according to claim 1, wherein the first magnetic region, the first semimagnetic region, the nonmagnetic region, a second semimagnetic region (14d) present at a position spaced farther apart from the adsorptive surface than the nonmagnetic region, the second semimagnetic region including a ferrite structure, a martensite structure, and an austenite structure, and a second magnetic region (12b) present at a position spaced farther apart from the adsorptive surface than the second semimagnetic region, the second magnetic region mainly including a ferrite structure, are formed continuously and integrally along the axial direction of the tubular member.

* * * * *